(12) United States Patent
Jacobi

(10) Patent No.: US 11,364,584 B2
(45) Date of Patent: Jun. 21, 2022

(54) SYSTEM AND METHOD FOR FAST REMOVAL OF CUT PARTS FROM A PROCESSING SYSTEM

(71) Applicant: Bystronic Laser AG, Niederönz (CH)

(72) Inventor: Stefan Alfons Jacobi, Bad Westernkotten (DE)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 17/277,643

(22) PCT Filed: Jun. 5, 2020

(86) PCT No.: PCT/EP2020/065587
§ 371 (c)(1),
(2) Date: Mar. 18, 2021

(87) PCT Pub. No.: WO2020/245332
PCT Pub. Date: Dec. 10, 2020

(65) Prior Publication Data
US 2021/0308814 A1     Oct. 7, 2021

(30) Foreign Application Priority Data

Jun. 7, 2019  (DE) ...................... 10 2019 115 571.1

(51) Int. Cl.
*B23Q 7/00* (2006.01)
*B23Q 7/04* (2006.01)
*B23Q 7/16* (2006.01)

(52) U.S. Cl.
CPC .............. *B23Q 7/003* (2013.01); *B23Q 7/04* (2013.01); *B23Q 7/16* (2013.01)

(58) Field of Classification Search
CPC . B23Q 7/003; B23Q 7/04; B23Q 7/16; B23Q 7/045; B21D 43/20; B25J 9/0093;
(Continued)

(56) References Cited

U.S. PATENT DOCUMENTS 6,360,142 B1 *  3/2002  Miura .................... B25J 9/1682
                                                              700/245
6,579,053 B1 *  6/2003  Grams .................... B25J 15/10
                                                              198/348
(Continued)

FOREIGN PATENT DOCUMENTS

DE        3040277 A1     6/1982
DE    102008019110 A1   10/2008

OTHER PUBLICATIONS

International Preliminary Report on Patentability for PCT/EP2020/065587 filed Jun. 5, 2020, IPEA: EPO, dated Feb. 16, 2021.

*Primary Examiner* — Gregory W Adams
(74) *Attorney, Agent, or Firm* — Workman Nydegger

(57) ABSTRACT

The present invention relates to a removal system and a method for removing parts processed in a processing system (200). The removal system is designed for engagement with a transportation unit (110) which is used for intermediate storage and/or transportation of a workpiece processed with the processing system (200), the processed workpiece comprising the parts to be removed. The removal system comprises a bridge movement system (120) which extends with its central longitudinal axis transversely to the longitudinal axis of the transportation unit (110) and can be moved axially in the longitudinal axis of the transportation unit (110). In addition, the removal system comprises a first parts conveyor system, which is arranged on the bridge movement system (120) and extends substantially parallel to the central longitudinal axis of the bridge movement system. Finally, the removal system comprises control unit which communicates with the transportation unit, the bridge movement system and the first parts conveyor system and provides control commands for the transportation unit, the bridge movement system and the parts conveyor system.

24 Claims, 11 Drawing Sheets

(58) Field of Classification Search
CPC .. B26D 7/0633; B65G 61/00; G05B 19/4182; G05B 2219/39106; G05B 2219/40014
See application file for complete search history.

(56) References Cited

U.S. PATENT DOCUMENTS

| | | | | |
|---|---|---|---|---|
| 7,976,260 | B2* | 7/2011 | Hirata | B23Q 7/045 |
| | | | | 414/222.01 |
| 9,950,879 | B2* | 4/2018 | Toncelli | B66C 1/02 |
| 2008/0265498 | A1 | 10/2008 | Katsuyama | |
| 2013/0110288 | A1* | 5/2013 | Cassano | B25J 9/1666 |
| | | | | 700/248 |
| 2013/0340329 | A1* | 12/2013 | van den Top | A01G 18/70 |
| | | | | 47/1.1 |
| 2019/0337041 | A1* | 11/2019 | Morita | B21D 43/287 |

\* cited by examiner

SYSTEM AND METHOD FOR FAST REMOVAL OF CUT PARTS FROM A PROCESSING SYSTEM

The present invention relates to a removal system for removing parts processed in a processing system and a method for removing.

In the processing industry, in particular in the metalworking industry, for example in laser cutting, a high proportion of the processing steps and/or manufacturing steps are carried out fully automatically. The processing systems, for example laser cutting systems, become more efficient through automation, the parts produced are of higher quality and the cycle time with which the parts can be produced can be reduced. The processing systems have the disadvantage or cannot fully implement the advantages resulting from the automation, since there is no automation solution available for handling the produced parts of the raw material (workpiece) that can cover the cycle time of the laser cutting systems. The cycle time is the time that the laser cutting system needs to cut parts from a workpiece (metal sheet).

In processing systems, such as laser cutting systems, a transportation unit designed as a changing table can be provided, which can receive a workpiece, which can then be moved automatically into the separate cutting area of the processing system with the changing table. After processing, the changing table with the parts cut from the workpiece can be transported out of the processing area into an area in which the cut parts can be removed from the scrap skeleton (residual material from the metal sheet).

The removal can be carried out manually in the case of solutions known in the prior art, the parts cut out from a metal sheet or from a workpiece being manually unloaded by a person. A new metal sheet can then also be placed manually on the transportation unit or the processing station by a person, or automated by a charging device. Manual loading and unloading increases the overall cycle time of the processing system. In order to improve the time-consuming manual material handling, stationary robot solutions known in the prior art are provided next to the transport table or the transportation unit, which unload the produced parts.

These robot solutions have the disadvantage that, due to their stationary and fixed positioning next to the transport table, they have to be dimensioned appropriately in size and mobility so that all areas of the transport table can be covered or gripped by the robot. This requires robots with several axes, for example 6-axis robots, to receive and remove all cut parts from the metal sheet. These robot solutions can increase the complexity and size and thus the costs of the entire processing system, since they are heavier and the plant has to be designed for the higher moments of the robots. In addition, the effort for adapting the robot solutions to new products increases.

It is therefore an object of the present invention to provide a removal system and a method for removing produced parts with a shorter cycle time and to at least partially overcome the disadvantages known in the prior art.

This object is achieved according to the invention by a removal system for removing parts processed in a processing system and a method for removing parts processed in a processing system with the features specified in the accompanying patent claims.

According to a first aspect, the invention provides a removal system for removing parts processed in a processing system, the removal system being designed for engagement with a transportation unit which is used for intermediate storage and/or transportation of a workpiece processed with the processing system, the processed workpiece comprising the part to be removed, with:
a bridge movement system which extends with its central longitudinal axis transversely to the longitudinal axis of the transportation unit and can be moved axially in the longitudinal axis of the transportation unit;
a parts conveyor system, comprising at least a first parts conveyor system which is arranged on the bridge movement system and extends substantially parallel to the central longitudinal axis of the bridge movement system; and
a control unit which communicates with the transportation unit, the bridge movement system and the parts conveyor system and provides control commands for the transportation unit, the bridge movement system and the parts conveyor system.

For the purposes of the present invention, a processing system is understood to mean a cutting system, in particular a laser cutting system. The laser cutting system comprises the actual laser cutting unit in which a workpiece, for example a metal sheet is processed into individual parts, for example cut into individual sheet metal parts or from which individual contours are cut out.

Furthermore, in the sense of the present invention, a bridge movement system is to be understood as an electromechanical movement system with a bridge-like structure. In one embodiment, the bridge movement system comprises two feed motors and thus two separate drive trains that move a common drive shaft. Electric motors, for example direct current motors, alternating and three-phase motors, in particular servomotors, can be used as feed motors. The separate feed motors can be operated in an angle-synchronised manner using special functions of the control unit and a converter system. The two feed motors are advantageously connected to one another according to a master-slave principle, so that the respective positions are identical to one another or are adjusted such that they behave as if only one feed motor were used. A mechanical shaft connection between the two sides of the bridge movement system is therefore advantageously not necessary. Each drive train preferably has a positioning measuring system and the actual position can be determined via the control unit by offsetting the actual position. The bridge movement system preferably extends with its central longitudinal axis transversely to the longitudinal axis of the transportation unit and can be moved axially in the longitudinal axis of the transportation unit. The bridge movement system can be guided via two guide arms (bridge pillars) in a guide system on both sides of the transportation unit and connected to the transportation unit by this. In an alternative embodiment, the bridge movement system can be guided and moved over the transportation unit via an additional frame that is installed on both sides next to the transportation unit.

In addition, in the sense of the present invention, the control unit of the removal system relates to a control unit which communicates with the transportation unit, the bridge movement system and the parts conveyor system. In one embodiment, the control unit communicates with a first, second and/or third parts conveyor system and a gripping system. A control unit refers to any electronic device that includes a processor, such as a main processor (CPU), a dedicated processor, or a microcontroller. The processor is adapted to perform a dedicated computing task to provide electronic control commands. The control unit can receive data (an input), then perform a sequence of predetermined operations and thereby generate a result in the form of information or signals (an output). Depending on the context, the control unit either means a processor or, more generally, can refer to a processor in conjunction with an assembly of interconnected elements contained in a single housing or housings. In one embodiment, the control unit can represent a programmable logic controller (PLC) or a software implementation of a PLC on a processor in an industrial PC. Furthermore, the control unit can run as an entity on another system.

The present invention is based on the knowledge that there is a need for an improved removal system in which the time required for clearing the parts of the processed workpiece is reduced, so that the necessary clearing time substantially corresponds to the cutting time of the laser system. Advantageously, the parts of the processed workpiece can be removed in a structured manner, in particular can be deposited and removed in a structured manner on the parts conveyor system, during the processing time of the processing system by the removal system according to the invention and a new workpiece can be made available for processing on the transportation unit. The process time of the automation technology can thus be optimised in an advantageous manner and the processing system can be operated at full capacity. In addition, downtimes and errors within the system are reduced and the quality of the manufactured parts is improved by a fully automated and precise production.

Advantageous embodiments and further developments result from the subclaims and from the description with reference to the figures.

In the sense of the present invention, the first parts conveyor system is to be understood as a stationary or a movable (preferably mounted and movable on rollers) conveyor system which is arranged on the bridge movement system. The first parts conveyor system extends substantially parallel to the central longitudinal axis of the bridge movement system. The first parts conveyor system is preferably designed as a ribbon conveyor or belt conveyor. In an advantageous embodiment, the first parts conveyor system comprises at least a first axially movable conveyor belt which has a conveyor belt made of a material corresponding to the parts of the processed workpiece to be transported. The conveyor belt is replaceable. Parts of the processed workpiece can be deposited on the axially movable conveyor belt (manually and/or automated) and transported. In one embodiment, parts of the processed workpiece can be deposited on the axially movable conveyor belt by a gripping system and transported. The first parts conveyor system has at least one drive unit for driving the axially movable conveyor belt. The drive unit is preferably designed as an electric motor which communicates with the control unit and receives electronic control commands from the control unit or provides electronic response signals. In one embodiment, the axially movable conveyor belt can be moved in one direction of movement. The parts deposited on the first parts conveyor system can advantageously be conveyed to a further parts conveyor system or to a transport container (e.g. box, pallet). In an advantageous embodiment, the axially movable conveyor belt can be moved in two directions of movement. Advantageously, the parts deposited on the first parts conveyor system can be transported to a further parts conveyor system positioned on each side of the transportation unit or to a transport container positioned on each side of the transportation unit.

In an advantageous embodiment, the transportation unit comprises a transport table. The transport table is intended to receive a workpiece and to move it into the separate cutting area of the processing system or to transport cut parts from the processing area to an area in which the cut parts can be removed from the scrap skeleton (residual material from the metal sheet). In addition, the transportation unit is understood to be a movable transport table for intermediate storage and/or transport of the workpiece processed with a processing system. The processed workpiece, for example a metal sheet, comprises the parts to be removed or the processed parts of the workpiece (metal sheet). The transport table can have two directions of movement. In a first direction of movement, the transport table can be moved into the processing system (laser cutting system) and out of the processing system. This first direction of movement is parallel or corresponds to the longitudinal axis of the transport table or the transportation unit. In the top view, the transportation unit is preferably approximately rectangular, the longitudinal axis corresponding to the process movement of the cut workpiece. In a possible second direction of movement, the transport table can be lowered and raised vertically with respect to the height of the machine bed of the processing system. This enables simplified loading and unloading of the transportation unit. The transport table can, for example, be designed to be movable on a guide system, e.g. rails. The transport table can also be designed to be movable via rollers, wheels, belts, chains, hydraulic or pneumatic cylinders, and electric drives. The transport table can be designed as or comprise a mobile robot unit. With the transport table, quickly and efficiently processed workpieces can be transported from the cutting area to the area where the machined parts can be removed from the workpiece and transported away, preferably can be deposited and transported on the first parts conveyor system.

In an advantageous embodiment, the transportation unit comprises a changing table. In the sense of the present invention, a changing table is understood to be a movable transport table for intermediate storage and/or transport of the workpiece processed with a processing system. The processed workpiece, for example a metal sheet, comprises the parts to be removed or the processed parts of the workpiece (metal sheet). The changing table in the sense of the present invention can be moved in two directions of movement. In a first direction of movement, the changing table can be moved into the processing system (laser cutting system) and out of the processing system (along the longitudinal axis of the transportation unit). In a possible second direction of movement, the changing table can be lowered and raised vertically with respect to the height of the machine bed of the processing system. The changing table advantageously comprises two separate and movable tables. In a preferred embodiment, the changing table has a hydraulic lifting unit and two planes, in particular two guide planes. Each of these two guide planes has one of the two separate tables. Since the two tables are designed separately and can be moved individually, a workpiece can be processed at the same time on the first table of the changing table in the laser cutting system and the parts of the workpiece that has already been processed on the second table of the changing table can be removed by the gripping system of the removal system according to the present invention. In a preferred embodiment of the changing table, the top guide plane with the first table is moved vertically upwards so that the bottom guide plane with the second table lies in a plane with the machine bed of the processing system. The second table can, for example, be moved into the processing system via a chain drive. Then the top guide plane with the first table can be lowered to a normal working height for removing the parts of the processed workpiece. The changing table can also be moved vertically downwards, so that the top guide plane with the first table lies in a plane with the machine bed of the processing system. The first table can then, for example, be moved into the processing system via a chain drive. Other drive forms, for example a hydraulic cylinder drive, a belt drive and/or separate motors, can also be used to drive the respective tables.

In an advantageous embodiment, the removal system comprises a gripping system. In an advantageous embodiment, the gripping system communicates with a control unit. The gripping system enables automated gripping of processed parts from the workpiece, in particular automatically controlled by control commands received from the control unit. The gripping system enables fast and precisely repeatable gripping and removal of parts, for example to the first parts conveyor system.

In an advantageous embodiment, the gripping system is arranged on the removal system and is designed to remove the processed parts from the workpiece and to deposit them at least on the first parts conveyor system. In this embodiment, the gripping system can be designed as a multi-axis robot (industrial robot), for example a robot with six axes. The gripping system can be arranged in a buffer area between the processing system and the transportation unit or in an area that is in the effective range of the robot or the robot arm. The robot arm can comprise several axes, which can be controlled separately and in different ways, for example by the robot controller and/or the control unit. In the sense of the present invention, different speeds and directions of rotation of the respective axes involve different ways. By means of the gripping system, the processed parts can advantageously be removed from the workpiece and/or gripped and deposited, for example, on the first parts conveyor system for removal.

In an advantageous embodiment, the gripping system is arranged on or at (for example below) the bridge movement system and is designed to remove the processed parts from the workpiece and to deposit them at least on the first parts conveyor system. In this embodiment, the gripping system can be designed as a SCARA robot, which can be moved over the workpiece by moving the bridge movement system and can thus remove processed parts from each area of the workpiece. In this regard, the gripping arm of the gripping system can be made smaller or a smaller number of axes is required.

In an advantageous embodiment, the first parts conveyor system comprises a first and a second axially movable conveyor belt, the directions of movement of which can be controlled independently of one another and which preferably move in opposite directions. In an advantageous manner, parts of the processed workpiece can be deposited and removed on a first or a second axially movable conveyor belt of the first parts conveyor system. In one embodiment, parts of the processed workpiece can be deposited and removed by the gripping system according to an embodiment of the present invention on a first or a second axially movable conveyor belt of the first parts conveyor system. The first and the second axially movable conveyor belt of the first parts conveyor system each have at least one drive unit for driving the respective axially movable conveyor belt. The respective drive unit is preferably designed as an electric motor which communicates with the control unit and receives electronic control commands from the control unit or provides response signals. In one embodiment, the axially movable conveyor belts can be moved in one direction of movement. Advantageously, the parts deposited on the first parts conveyor system can be transported according to a sorting plan and/or removal plan to a second or third parts conveyor system and/or a first or second transport container positioned on the respective sides of the transportation unit. A simplified sorting and separation of the parts can thus advantageously be achieved.

In an advantageous embodiment, the removal system comprises a second parts conveyor system with at least one conveyor belt that is axially movable in the direction of the longitudinal axis of the transportation unit. The second parts conveyor system is preferably designed as a ribbon conveyor or belt conveyor. In an advantageous embodiment, the second parts conveyor system comprises an axially movable conveyor belt which has a conveyor belt made of a material corresponding to the parts of the processed workpiece to be transported. The second parts conveyor system can advantageously receive the parts of the processed workpiece from the first parts conveyor system and, depending on the corresponding use, feed them to other systems or transport them to a transport container. Advantageously, the parts of the processed workpiece are removed automatically. In addition, simplified sorting and separation can advantageously take place. The axially movable conveyor belt of the second parts conveyor system has at least one drive unit for driving the axially movable conveyor belt. The at least one drive unit is preferably designed as an electric motor that communicates with the control unit and receives electronic control commands from the control unit or provides response signals. In an advantageous embodiment, the conveyor belt of the second parts conveyor system can be moved in a first direction and in a second direction. This enables an individual installation and use of the removal system in a respective industrial scenario or adaptation to production-related and/or location-specific requirements.

In an advantageous embodiment, the gripping system comprises at least one gripping arm, on which the at least one gripping tool is arranged. In a further advantageous embodiment, the gripping system comprises at least one gripping robot, preferably two gripping robots, the gripping robot having at least one tool, in particular a gripping tool. The gripping system is preferably a SCARA robot (Selective Compliance Assembly Robot Arm). The SCARA robot is an industrial robot with a horizontal gripping arm. In one embodiment, the SCARA robot comprises four axes and four degrees of freedom. The four axes are preferably designed as serial kinematics so that the coordinate origin of the following axis is only dependent on the position of the previous axis. In one embodiment, the first and second axes of the SCARA robot are designed for a rotating movement. The third and fourth axes are preferably made of one component and enable a rotating movement and a linear movement. The gripping tool is arranged at the lower end of the gripping arm.

In one embodiment, the SCARA robot has a range in the range between 100 mm and 1,200 mm over the length of the gripping arm. The SCARA robot of the present invention is designed to handle parts of a processed workpiece in a payload range between 1 kg and 200 kg, preferably 8 kg. In addition, the SCARA robot of the present invention is designed to handle parts of a processed workpiece with an area of 350 mm×350 mm. Due to the fast and repeatable movements, the SCARA robot can advantageously be used for pick-and-place applications, in which a part of a processed workpiece is to be transported from the workpiece to a parts conveyor system.

In an alternative embodiment, the gripping system can be designed as a Cartesian robot system. The Cartesian robot system comprises linear drives and can be designed as a two-axis or three-axis Cartesian robot system.

In an alternative embodiment, the gripping system can be designed as a gripping robot with several axes which can be controlled differently and with separate drive units. The drive units can comprise electrical, pneumatic and/or hydraulic drives. With a gripping robot, a work sequence can be carried out autonomously, precisely, repeatable at high speed and automatically. The gripping system can comprise one or more gripping tools. The gripping tools are interchangeable and can be exchanged or replaced automatically or by manual input using the gripping system.

In an advantageous embodiment, the gripping tool comprises at least one electrically conductive gripping tool. For the purposes of the present invention, an electrically conductive gripping tool is to be understood as a gripping tool with which objects can be gripped or held and transported from a first position by the gripping system to a second position. In particular, a part of the processed workpiece can be transported from the transportation unit to the first parts conveyor system by the gripping tool of the gripping system. The electrically conductive gripping tool is designed such that it conducts an electrical current. Advantageously, the electrically conductive gripping tool can thus be connected to a voltage source via an electrical connection, for example an electrical line. The electrically conductive gripping tool has a resistance with a specific, material-dependent resistance value, as a result of which a voltage across the electrically conductive gripping tool drops when a current flows through the electrically conductive gripping tool. The resistance value also depends on the size of the electrically conductive gripping tool.

In an advantageous embodiment, the electrically conductive gripping tool is designed as an electrically conductive suction device, preferably as an electrically conductive vacuum suction device. In an advantageous manner, electrically conductive suction devices are available in different materials with different Shore hardnesses so that a corresponding suction device can be selected and used for each processed part with a wide range of shapes, sizes, masses, materials and/or material thicknesses. The electrically conductive vacuum suction device thus forms the interface or interfaces to the processed part. The electrically conductive vacuum suction device can be designed in a round and in an oval design. The round electrically conductive vacuum suction device is suitable for handling flat workpieces. The oval, electrically conductive vacuum suction device can be used for narrow, elongated workpieces. In one embodiment, the electrically conductive vacuum suction device can be designed as a flat or bellows suction device. Flat suction devices have the advantage of a low overall height and a small internal volume. The small volume ensures short blow-off times. In addition, flat suction devices in this design have good inherent stability and ensure high positional accuracy. Flat suction cups can be used in highly dynamic processes. Bellows suction devices with one or more bellows have the advantage that height differences can be compensated for. The bellows also provides a damping effect when the gripping system with the gripping tool touches the workpiece or the parts of the processed workpiece. Sensitive parts of the processed workpiece can thus be gripped gently with a bellows suction device. In a further embodiment, the electrically conductive vacuum suction device can be designed as a flat suction device with a spring plunger. The height can advantageously be compensated for.

In one embodiment, the electrically conductive gripping tool can have a plurality of vacuum suction devices, in which one vacuum suction device is designed as an electrically conductive vacuum suction device. Processed parts with a wide range of different shapes, sizes, dimensions, materials and/or material thickness can thus be sucked in (gripped).

In a further embodiment, the electrically conductive gripping tool can have a plurality of vacuum suction devices, in which at least two vacuum suction devices are designed as electrically conductive vacuum suction devices. Processed parts with a wide range of different shapes, sizes, dimensions, materials and/or material thickness can thus be sucked in (gripped). Furthermore, the functionality of the electrically conductive vacuum suction device is designed in a redundant manner.

In an advantageous embodiment, the electrically conductive vacuum suction device lifts the processed parts out of the workpiece by the lifting height of the vacuum suction device. The lifting height represents the height at which the processed part is lifted or gripped from the workpiece when a vacuum is applied. The height corresponds to the suction volume of the electrically conductive vacuum suction device, in particular the height corresponds to the movement potential of the suction material up to the suction nozzle. The electrically conductive vacuum suction device is used to grip and move the processed part out of the workpiece. The electrically conductive vacuum suction device does not suck onto the part, but the ambient pressure (atmospheric pressure) presses the part against the electrically conductive vacuum suction device or the electrically conductive vacuum suction device against the part of the workpiece being processed. For this, the surrounding pressure (ambient pressure) must be higher than the pressure between the electrically conductive vacuum suction device and the processed part. This pressure difference can be achieved by connecting the electrically conductive vacuum suction device to a vacuum generator. The vacuum generator sucks the air between the electrically conductive vacuum suction device and the processed part. The air is thus evacuated. As soon as contact occurs between the electrically conductive vacuum suction device and the surface of the processed part and the electrically conductive vacuum suction device seals the workpiece surface against the ambient pressure, the necessary negative pressure is generated. The holding force of an electrically conductive vacuum suction device is obtained by multiplying the pressure difference by the effective suction area of the electrically conductive vacuum suction device. The holding force F results from the following formula:

$$F = \Delta p \times A.$$

Here, the parameter $\Delta p$ is the difference between the ambient pressure and the system pressure and the parameter A is the effective suction area (the effective area of an electrically conductive vacuum suction device which is subjected to vacuum). The holding force F is therefore proportional to the pressure difference and the area. The holding force F is greater, the higher the difference between ambient pressure and pressure in the electrically conductive vacuum suction device or the larger the effective suction area. The holding force F can be varied by changing the parameters of pressure difference and area. Advantageously, the parts to be lifted can be checked for contact with the processed workpiece before the actual lifting. This contact represents a material connection, for example a web of material between the part and the processed workpiece, which is detected before lifting, thus preventing the part from jamming or snagging during lifting, and thus the entire workpiece is not moved onto the transportation unit. The processing system and the entire processing process are therefore less prone to failure. In addition, the process time for checking the parts is advantageously reduced since the present invention can detect at any time whether the part is still in contact with the processed workpiece and the transportation unit (material web) as soon as the gripping tool touches the part of the processed workpiece.

In an advantageous embodiment, the electrically conductive gripping tool can be connected to a voltage source, in particular a DC voltage source. The electrically conductive gripping tool is advantageously conductive and has a resistance, as a result of which a voltage across the conductive gripping tool drops when the circuit is closed. This voltage drop can be detected and measured.

In an advantageous embodiment, the voltage source provides the electrically conductive gripping tool with a voltage in a range from 0.1 to 24 volts, in particular in a range from 8 to 12 volts, preferably of 10 volts. Advantageously, safely reduced voltages in a range of 0.1 to 24 volts can be applied to the electrically conductive gripping tool via a voltage source. The safely reduced voltages are preferably reduced via a voltage divider in such a way that 10 volts are present at the analogue input and in parallel to the electrically conductive gripping tool. Here, safely reduced voltages are to be understood as those voltages which are present in electrical systems due to a corresponding type of protective separation of different voltage levels. A distinction is made between separated extra-low voltage (SELV), protected extra-low voltage with electrically safe isolation (PELV) and functional extra-low voltage without electrically safe isolation (FELV).

In an advantageous embodiment, the gripping system has an analogue input which is designed to receive an analogue electrical signal. An analogue electrical signal can advantageously be received by the gripping system. An electrical voltage can be applied to the analogue input and can advantageously be evaluated for its voltage value. The evaluated voltage value can be used to control or manage electronic units.

In an advantageous embodiment, the analogue input can be connected to the same voltage source in parallel with the electrically conductive gripping tool. The analogue input with the same voltage source is advantageously connected in parallel to the electrically conductive gripping tool. Thus, the voltage provided by the voltage source at the analogue input drops as long as there is no electrical connection between the part and the processed workpiece. If there is an electrically conductive connection between the part and the processed workpiece and the electrically conductive gripping tool grips the processed part, a current flows from the electrically conductive gripping tool via the part to the processed workpiece, which has a connection to the transportation unit. The transportation unit has the corresponding ground potential for this. By connecting the electrically conductive gripping tool and the analogue input to a shared voltage source in parallel, a voltage drop at the analogue input can be generated and detected in the event of a faulty cut of the processed part.

In an advantageous embodiment, the gripping system comprises a detector unit which is designed to detect whether a part has an electrical connection to the processed workpiece. It can advantageously be determined whether the part still has a connection to the processed workpiece, as a result of which jamming and/or displacement of the workpiece or of the scrap skeleton on the transportation unit during lifting is avoided.

In a further advantageous embodiment, the control unit comprises a detector unit which has a 0 volt potential and which is designed to detect a voltage drop at the analogue input. For the purposes of the present invention, a voltage drop is understood to mean the reduction from a previously applied voltage value to a lower voltage value caused by an event. The detector unit can be designed, for example, as a measuring device, in particular a voltage measuring device, via which a voltage or a contiguous or decreasing voltage can be determined. The voltage measuring device is connected in parallel to a consumer, component or to the voltage source. When measuring at the voltage source, the current voltage value is measured. The voltage drop at this one consumer is measured at a consumer. This voltage drop corresponds to a partial voltage from the total voltage of the voltage source. In order not to influence the circuit to be measured, the internal resistance of the voltage measuring device should be as high-resistance as possible. An infinitely high internal resistance would be ideal. A voltage drop with reference to the same potential can thus advantageously be determined and evaluated. In an advantageous embodiment, the detector unit is designed as an analogue input card of the control unit. The analogue input card can be designed to be configurable, so that it has a different function behaviour/output behaviour in relation to changing voltage drops.

In an advantageous embodiment, the processed workpiece with the processed parts is stored on a transportation unit of the processing system and the transportation unit has the same potential as the detector unit. A current flow across the electrically conductive gripping tool thus advantageously occurs when there is an electrically conductive connection between the part and the processed workpiece and the electrically conductive gripping tool is in contact with the part. A voltage drop can be detected by the same potential of the detector unit, including the analogue input.

In an advantageous embodiment, the detector unit detects a voltage drop at the analogue input if a part has an electrical connection to the processed workpiece. For the purposes of the present invention, a voltage drop is understood to mean the reduction from a previously applied voltage value to a lower voltage value caused by an event. A faulty processed part can thus be advantageously detected. The event can represent, for example, the electrical connection between the part and the processed workpiece, as well as the transportation unit.

In an advantageous embodiment, the at least one gripping robot is arranged on the bridge movement system in such a way that the gripping robot can remove parts to be removed from each area of the workpiece. Advantageously, all parts can thus be removed from the processed workpiece in a structured manner in a short time. The gripping robot is arranged according to the length of the gripping arm and the resulting range.

In an advantageous embodiment, the two gripping robots are arranged on the bridge movement system in such a way that they can collectively remove the parts to be removed from each area of the processed workpiece. Advantageously, all parts can thus be removed from the processed workpiece in a structured manner in a short time. The gripping robots are arranged according to the length of the gripping arm and the resulting range or working areas. Advantageously, the use of two gripping robots allows the dimensions of the respective robots, in particular the gripping arms, to be smaller, and a shorter cycle time for the removal of the parts of the processed workpiece can also be achieved. In addition, the total working area of the gripping robots can be increased together so that workpieces with a larger area can be processed or the parts of the processed workpiece can be removed.

In an advantageous embodiment, the removal system comprises a third parts conveyor system, with at least one movable conveyor belt arranged axially on the other side of the transportation unit in the direction of the longitudinal axis of the transportation unit. The transportation unit of the removal system is advantageously arranged spatially and in particular in a top view between the second and third parts conveyor system. The third parts conveyor system is preferably designed as a ribbon conveyor or belt conveyor. In an advantageous embodiment, the third parts conveyor system comprises an axially movable conveyor belt which has a conveyor belt made of a material corresponding to the parts of the processed workpiece to be transported. The third parts conveyor system can advantageously receive the parts of the processed workpiece from the first parts conveyor system and, depending on the corresponding use, feed them to other systems or transport them to a transport container. Advantageously, the parts of the processed workpiece are removed automatically. In addition, simplified sorting and separation can advantageously take place. The axially movable conveyor belt of the third parts conveyor system has at least one drive unit for driving the axially movable conveyor belt. The at least one drive unit is preferably designed as an electric motor that communicates with the control unit and receives electronic control commands from the control unit or provides response signals. In an advantageous embodiment, the conveyor belt of the third parts conveyor system can be moved in a first direction and in a second direction. This enables an individual installation and use of the removal system in a respective industrial scenario or adaptation to production-related and/or location-specific requirements.

In an advantageous embodiment, the control unit uses a collision avoidance algorithm stored in a memory unit, which ensures that the two gripping robots do not collide in a predefinable collision zone of a shared working area. The working area of the two gripping robots of the gripping system advantageously comprises a predefined and shared collision zone, which is monitored via the collision avoidance algorithm. If one of the two gripping robots of the gripping system is in the collision zone, the collision avoidance algorithm ensures that the other robot cannot be moved into the collision zone while the first gripping robot is in the collision zone.

In an advantageous embodiment, the gripping system is controlled with electronic control commands which are generated by the control unit in response to a removal plan generated on the basis of a detected cutting plan. The removal plan can be provided as an electronic file. Alternatively, the removal plan can also be read in or detected via a data interface. Advantageously, the control unit can use a computer program to generate a removal plan from the cutting plan. The cutting plan preferably includes the shape, size and position of the parts of the processed workpiece that are to be removed. The removal plan preferably includes information about the position of the parts of the processed workpiece and the gripping tool to be used in accordance with the shape and size of the parts of the processed workpiece to be removed. The gripping tools are selected by the control unit based on the removal plan. The removal plan can be provided to the control unit in an XML file format, for example. The removal plan preferably comprises structured and cyclically optimised specifications from the control unit to the first and second gripping robots of the gripping system. In particular, the removal plan includes information about the gripping system or the gripping robot and the tool in order to remove the corresponding part of the processed workpiece.

In an advantageous embodiment, the first parts conveyor system, the second parts conveyor system and/or the third parts conveyor system are controlled by the control unit in synchronisation with the gripping system, in particular with regard to a control and/or regulation of a speed at which the first parts conveyor system, the second and/or the third parts conveyor system are operated. The operating parameters of the parts conveyor systems can advantageously be configured and adapted by the control system in accordance with the removal plan. This enables the operating parameters to be adapted to the parts to be removed.

In an advantageous embodiment, the gripping system is arranged to be movable along the central longitudinal axis of the bridge movement system. Advantageously, at least one gripping robot of the gripping system is arranged movably or displaceably on the bridge movement system. The gripping robot can be moved along the central longitudinal axis of the bridge movement system so that, with smaller dimensions of the gripping arm, the parts to be removed can be removed from every area of the processed workpiece.

In an advantageous embodiment, a tool change system for changing the tools for the gripping system is arranged in a buffer area between the processing system and the transportation unit. In one embodiment, the tool change system can be moved or displaced in the longitudinal axis of the transportation unit. In one embodiment, the tool change system is movable or displaceable in the longitudinal axis of the transportation unit in accordance with or with the bridge movement system. The tool of the gripping system is modularly interchangeable. Processed parts of a wide variety of shapes, sizes, masses, materials and/or material thickness can thus be gripped and transported with a gripping tool designed for this purpose. The tools can be stored in the tool change system and selected by the control unit in accordance with the removal plan.

According to a further aspect, the invention provides a method for removing parts processed in a processing system, having the following method steps:

Detection of a processed workpiece with parts on a transportation unit; the detection can preferably be determined electronically via a corresponding signal (optically and/or by means of an end position sensor etc.);

Generating or reading or detecting a removal plan for the processed parts on the basis of a recorded cutting plan;

Providing control commands for removing the processed parts according to the generated or read removal plan, so that one processed part after the other can be removed from the workpiece and deposited on at least a first parts conveyor system arranged on a bridge movement system.

In an advantageous embodiment of the method, providing control commands comprises providing control commands for a gripping system for removing the processed parts according to the generated removal plan, in which the gripping system, which is arranged on a bridge movement system, which is moveable with its central longitudinal axis transversely to the longitudinal axis of the transportation unit, is instructed to remove one processed part after the other from the workpiece and deposit these on a first parts conveyor system arranged on a bridge movement system. In an advantageous manner, the gripping system can be activated in order to grab and remove, quickly and precisely, and repeatably, processed parts from the workpiece, or to deposit them on a first parts conveyor system. The time required to remove the processed parts is reduced.

In an advantageous embodiment of the method, a conveying direction and/or a conveying speed can be set as a function of the removal plan of the first parts conveyor system. In an advantageous manner, the conveying direction and conveying speed can be adjusted for an optimised removal and/or sorting according to the parts of the processed workpiece, in particular according to the shape, size and position of the parts.

In an advantageous embodiment of the method, the first parts conveyor system comprises two conveyor belts, the direction of which is opposite. Advantageously, the parts deposited on the first parts conveyor system can be transported according to a sorting plan and/or removal plan to a second or third parts conveyor system and/or a first or second transport container positioned on the respective sides of the transportation unit. A simplified sorting and separation of the parts can thus advantageously be achieved.

In an advantageous embodiment of the method, the gripping system comprises two gripping robots, which are instructed with the generated control commands to grip processed parts in a work area assigned to them and thereby apply a collision avoidance algorithm in a predefinable collision zone. A collision zone is advantageously defined as a zone into which a second robot cannot be brought when a first robot is removing parts of the processed workpiece or moving toward a part to be removed in the collision zone. A collision between the gripping robots of the gripping system is thus avoided.

In an advantageous embodiment of the method, control commands are generated for moving the bridge movement system during a removal process, for moving the first parts conveyor system and for moving the bridge movement system into a rest position after the workpiece has been removed. This enables a fully automatic and cyclically optimised removal of the parts of the processed workpiece.

The invention also provides a computer program with program code for executing a method according to any one of the preceding method claims when the computer program is executed on an electronic device. The computer program can be provided as a signal by download or can be stored in a memory unit of a portable device with the computer-readable program code contained therein in order to cause a removal system to execute instructions in accordance with the above-mentioned method. The implementation of the invention by means of a computer program product has the advantage that already existing electronic devices, for example computers, portable devices can easily be used by software updates in order to detect, as proposed by the invention, whether a processed part has been completely cut from a workpiece processed in a processing system.

In one embodiment, the computer program is designed with program code for executing a method for detecting whether a processed part of a workpiece processed in a processing system has been completely cut. The method comprises several steps. In a first step, the processed workpiece with the parts is detected on a transportation unit belonging to the processing system. This step takes into account the cutting information of the parts provided by the processing system, for example a cutting plan. The positions of the parts that are to be removed are thus known. In a further step, part of the processed workpiece is lifted using a gripping tool of a gripping system. In one embodiment of the present invention, the gripping tool comprises an electrically conductive gripping tool, in particular an electrically conductive suction device, preferably an electrically conductive vacuum suction device. For the purposes of the present invention, lifting is to be understood to mean the lifting of a processed part by the lifting height of the vacuum suction device from the workpiece. In one embodiment, the lifting height corresponds to a suction volume of the vacuum suction device. In a further step, a voltage drop at an analogue input of the gripping system is detected if a processed part has an electrical connection to the workpiece. The voltage drop at the analogue input can then be detected when the electrically conductive gripping tool lifts the part out of the processed workpiece.

The computer program can be executed in a distributed manner as a distributed system so that, for example, isolated method steps are carried out on a first computing unit and other method steps are carried out on a second computing unit.

The above embodiments developments can, if appropriate, be combined with one another as desired. Further possible embodiments, developments and implementations of the invention also include combinations of features of the invention described above or below with reference to the exemplary embodiments, which are not explicitly mentioned. In particular, the person skilled in the art will also add individual aspects as improvements or additions to the respective basic form of the present invention. In particular, features in the system claims can also be used in the method claims.

BRIEF DESCRIPTION OF THE FIGURES

In the following detailed description of the figures, non-limiting exemplary embodiments with the features and further advantages thereof will be discussed with reference to the drawings. In the drawings.

Figure 1:
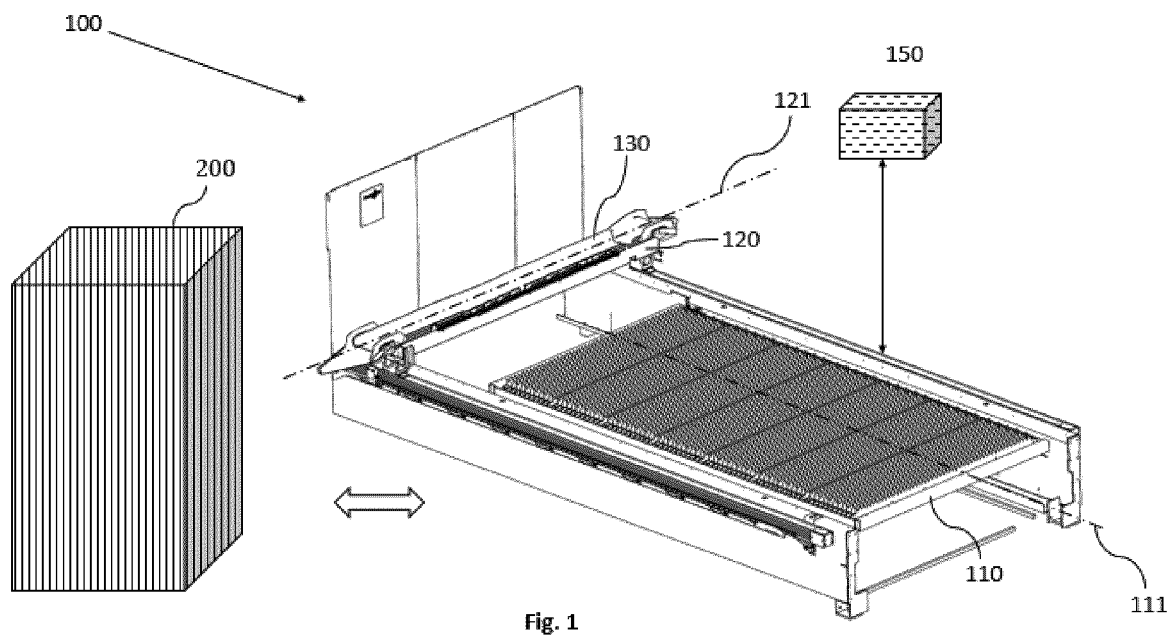
FIG. 1 shows a block diagram to show a possible exemplary embodiment of a removal system according to the invention.

The accompanying drawings are intended to provide further understanding of the embodiments of the invention. They illustrate embodiments and, in connection with the description, serve to explain principles and concepts of the invention. Other embodiments and many of the advantages mentioned result from the drawings. The elements of the drawings are not necessarily shown to scale with respect to one another.

In the figures of the drawing, elements, features and components which are the same, have the same function and have the same effect—unless otherwise stated—are provided with the same reference symbols.

DETAILED DESCRIPTION OF THE INVENTION

FIG. 1 shows a block diagram to show a possible exemplary embodiment of a removal system 100 according to the invention. In FIG. 1, reference numeral 100 denotes the removal system according to the present invention. The removal system 100 comprises a transportation unit 110. The transportation unit 110 is designed for intermediate storage and/or transportation of a workpiece 11 (cf. FIG. 7) processed with the processing system 200. The processed workpiece 11, for example a metal sheet, comprises the parts 10 to be removed (cf. FIG. 7). The transportation unit 110 can preferably be moved in two directions of movement. In a first direction of movement, the transportation unit 110 can move into the processing system 200, for example a laser cutting system, and out of the processing system 200. In a second direction of movement, the transportation unit 110 can be lowered and raised vertically with respect to the height of the machine bed of the processing system 200. In one embodiment, the transportation unit 110 can be designed as a transport table. In a further embodiment, the transportation unit 110 can be designed as a changing table. The changing table advantageously comprises two separate and movable tables. In a preferred embodiment of the transportation unit 110, the changing table has a hydraulic lifting unit and two planes, in particular two guide planes. Each of these two guide planes has one of the two separate tables. Since the two tables are designed separately and can be moved individually, a workpiece 11 can be processed at the same time on the first table of the changing table in the laser cutting system and the parts of the workpiece 11 that has already been processed on the second table of the changing table can be removed by the gripping system 140.

The removal system 100 further comprises a bridge movement system 120. The bridge movement system 120 extends with its central longitudinal axis 121 transversely and preferably at a 90° angle to the longitudinal axis 111 of the transportation unit 110 and can be moved axially in the longitudinal axis 111 (in the direction) of the transportation unit. The bridge movement system 120 is an electromechanical movement system that comprises at least two feed motors and thus two separate drive trains that move a common drive shaft. Electric motors, for example direct current motors, alternating and three-phase motors, in particular servomotors, can be used as feed motors. The separate feed motors can be operated in an angle-synchronised manner using special functions of the control unit 150 and a converter system. The two feed motors are advantageously connected to one another according to a master-slave principle, so that the respective positions are identical to one another or are adjusted such that they behave as if only one feed motor were used. A mechanical shaft connection between the two sides of the bridge movement system 120 is therefore advantageously not necessary. Each drive train preferably has a positioning measuring system and the actual position can be determined via the control unit by offsetting the actual position. The bridge movement system 120 is preferably guided via two guide arms (bridge pillars) in a guide system on both sides of the transportation unit 110 and connected to the transportation unit by this. In an alternative embodiment, the bridge movement system 120 can be guided and moved over the transportation unit 110 (not shown) via an additional frame that is installed on both sides next to the transportation unit 110. The bridge movement system 120 can be moved forward and backward along the longitudinal axis 111 of the transportation unit 110.

The removal system 100 has a first parts conveyor system 130 which is arranged on the bridge movement system 120. The parts conveyor system 130 extends substantially parallel to the central longitudinal axis 121 of the bridge movement system 120. The first parts conveyor system 130 preferably runs on, under or at the bridge movement system 120. In one embodiment, the first parts conveyor system preferably runs below a gripping system 140 (cf. FIG. 2). The first parts conveyor system 130 is preferably designed as a ribbon conveyor or belt conveyor. In an advantageous embodiment, the first parts conveyor system 130 comprises at least a first axially movable conveyor belt which has a conveyor belt made of a material corresponding to the parts 10 of the processed workpiece 11 to be transported. The conveyor belt is replaceable. The first parts conveyor system 130 has at least one drive unit for driving the axially movable conveyor belt. The drive unit is preferably designed as an electric motor which communicates with the control unit 150 and receives electronic control commands from the control unit 150 or provides electronic response signals. In one embodiment, the axially movable conveyor belt 131 can be moved in one direction of movement. The parts 10 deposited on the first parts conveyor system 130 can advantageously be conveyed to a further parts conveyor system 160, 180 (not shown) or to a transport container 190 (cf. FIG. 5). In an advantageous embodiment, the axially movable conveyor belt can be moved in two directions of movement. Advantageously, the parts 10 deposited on the first parts conveyor system 130 can be transported to a further parts conveyor system 160, 180 (cf. FIG. 4) positioned on each side of the transportation unit 110 or to a transport container 190 (not shown) positioned on each side of the transportation unit.

In an advantageous embodiment, the first parts conveyor system 130 comprises a first axially movable conveyor belt 131 and a second axially movable conveyor belt 132, the directions of movement of which can be controlled independently of one another and which preferably move in opposite directions. In one embodiment, the parts 10 of the processed workpiece 11 can be manually deposited and removed on a first axially movable conveyor belt 131 and/or a second axially movable conveyor belt 132 of the first parts conveyor system 130. Advantageously, parts 10 of the processed workpiece 11 can be deposited and removed on a first axially movable conveyor belt 131 or a second axially movable conveyor belt 132 of the first parts conveyor system 130 by means of a gripping system 140 (cf. FIG. 2) according to an embodiment of the present invention. The first axially movable conveyor belt 131 and the second axially movable conveyor belt 132 of the first parts conveyor system 130 each have at least one drive unit for driving the respective axially movable conveyor belt. The respective drive unit is preferably designed as an electric motor that communicates with the control unit 150 and receives electronic control commands from the control unit 150 or provides response signals. Advantageously, the parts deposited on the first parts conveyor system 130 can be transported according to a sorting plan and/or removal plan to a second parts conveyor system 160 or third parts conveyor system 180 and/or a first transport container 190 or second transport container (not shown) positioned on the respective sides of the transportation unit 110. A simplified sorting and separation of the parts can thus advantageously be achieved.

The removal system 100 also comprises a control unit 150, which communicates with the transportation unit 110, the bridge movement system 120 and the first parts conveyor system 130 and provides control commands for the transportation unit 110, the bridge movement system 120 and the parts conveyor system 130. For example, the control unit 150 can provide control commands for setting the conveying direction and/or conveying speed of the conveyor belt or conveyor belts as a function of the removal plan. Furthermore, the control unit 150 is designed to carry out the method according to the present invention.

In one embodiment, the control unit 150 is implemented as a central unit (e.g. industrial PC, PLC) for the removal system 100. In one embodiment, the control unit 150 can be instantiated as an additional entity on a controller of the removal system 100. In one embodiment, the control unit can be hosted on another system that communicates with the removal system.

The control unit 150 is designed to set control signals for setting the conveying speed and/or the conveying direction of the first parts conveyor system 130, in particular for the drives of the conveyor belt of the first parts conveyor system 130, in accordance with the removal plan. In one embodiment, the control unit 150 is designed to set control signals for setting the conveying speed and/or the conveying direction of the first parts conveyor system 130, in particular for the drives of the conveyor belts 131, 132 according to the embodiment shown in FIG. 4 of the first parts conveyor system 130, in accordance with the removal plan. In a further embodiment, the control unit 150 is designed to set control signals for setting the conveying speed and/or the conveying direction of the second parts conveyor system 160 and/or the third parts conveyor system 180, in particular for the drive of the conveyor belt 161 (not shown) and the drive of the conveyor belt 181 (not shown), in accordance with the removal plan.

In a further embodiment, the control unit 150 is designed to receive or process response signals about the position of the conveyor belt, the conveyor speed and/or the conveying direction of the conveyor belt of the first conveyor system 130, the second conveyor system 160 and/or the third conveyor system 180 and correspondingly to provide further control signals on the basis of the received response signals. The detected response signals can be provided, for example, by motion sensors, angle sensors, distance sensors, ultrasonic sensors, light barriers, etc., installed on the removal system 100.

In a further embodiment, the control unit 150 is designed to provide control signals for the bridge movement system 120, in particular for the synchronisation of the feed motors of the bridge movement system 120 for moving the bridge movement system 120 axially in the longitudinal axis 111 of the transportation unit 110. In this way, a synchronous movement of the feed motors is guaranteed. In particular, the control unit 150 can provide control signals for the removal of the parts 10 (cf. FIG. 7) of the processed workpiece 11 (cf. FIG. 7) into the provided transport containers 190, 190*i* (cf. FIG. 5). The control unit 150 can provide control commands to the bridge movement system 120, so that the parts 10 of the processed workpiece 11 are removed to the transport containers 190, 190*i* provided in accordance with the removal plan.

In a further embodiment, the control unit 150 is designed to receive and process response signals about the position of the bridge movement system 120, the travel speed and/or the direction of travel of the bridge movement system 120 and to provide further control commands accordingly on the basis of the received response signals.

Figure 2:
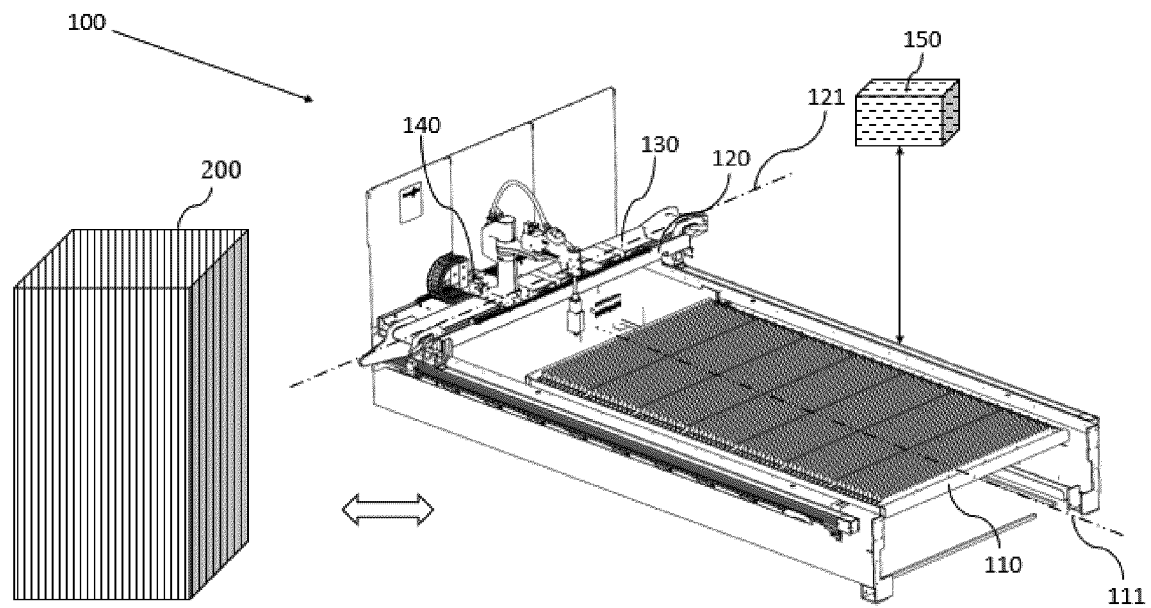
FIG. 2 shows a block diagram to show a further possible exemplary embodiment of a removal system according to the invention.

FIG. 2 shows a block diagram to show a possible exemplary embodiment of a removal system 100 according to the invention. The exemplary embodiment of the removal system 100 according to the invention shown in FIG. 2 comprises the same components as the exemplary embodiment of the removal system 100 according to the invention shown in FIG. 1. In addition, the removal system 100 has a gripping system 140. The gripping system 140 is arranged on the bridge movement system 120 and is designed to remove the parts 10 from the processed workpiece 11 and to deposit them at least onto the first parts conveyor system 130. In one embodiment, the gripping system 140 comprises a gripping robot 141. The gripping system 140 is preferably designed as a SCARA robot (Selective Compliance Assembly Robot Arm).

In an alternative embodiment, the gripping system 140 comprises at least one multi-axis robot (not shown), which is arranged in the effective area of its gripping arm to the transportation unit 110 in a buffer area between the processing system 200 and the removal system 100. The multi-axis robot can be designed, for example, as a 6-axis robot. In one embodiment, a gripping system 140 designed as a multi-axis robot can be arranged on each side of the removal system 100 or the transportation unit 110 of the removal system 100.

In an alternative embodiment, the gripping system 140 can be designed as a Cartesian robot system. The Cartesian robot system comprises linear drives and can be designed as a two-axis or three-axis Cartesian robot system.

In one embodiment, the control unit 150 can be implemented locally on the gripping system 140, in particular locally on the gripping robot 141, 142 (not shown). In one embodiment, the control unit 150 can be implemented in the control unit or the controller of the gripping robot (not shown) and/or can be instantiated as an additional entity on the controller. In particular, the control unit 150 can be implemented as a central unit for the removal system 100.

In a further embodiment, the control unit 150 is designed to provide control signals for the gripping system 140, in particular for the gripping robot 141 and the gripping robot 142 (cf. FIG. 6), and to receive or process response signals of the gripping system 140 about the position (end positions), travel speed of the gripping system 140, in particular the gripping robot in each case about the gripping arm and/or gripping tool and to provide corresponding control commands.

Figure 3:
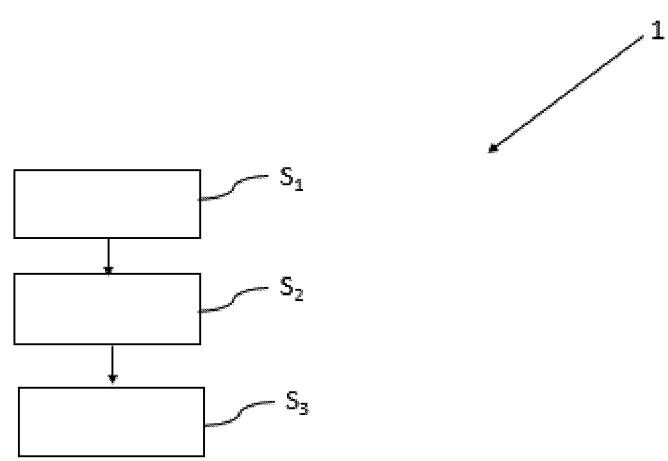
FIG. 3 shows a flowchart to show a possible exemplary embodiment of a method according to the invention.

FIG. 3 shows a flowchart to show a possible exemplary embodiment of a method according to the invention.

In the exemplary embodiment shown, method 1 comprises several steps. In a first step S1, a processed workpiece 11 with parts 10 is detected on a transportation unit 110. In a preferred embodiment of the invention, this step is computer-implemented. The step S1 takes into account the cutting information of the parts 10 of the processed workpiece 11 provided by the control unit 150, for example a cutting plan. The positions of the parts 10 of the processed workpiece 11 which are to be removed are thus known. In addition, other relevant parameters (such as weight and shape) of the parts to be removed can be calculated and provided, which are taken into account for the calculation of the control commands.

In a further step S2, a removal plan for the parts 10 is generated on the basis of a recorded cutting plan. In an alternative embodiment, the removal plan can be provided, for example as an XML file, and can be read in or detected via the control unit 150.

In a further step S3, control commands are provided for a gripping system 140 for removing the parts 10 according to the generated removal plan, so that one part 10 after the other is removed from the processed workpiece 11 and deposited on at least one first parts conveyor system 130 arranged on the bridge movement system 120. The processed parts 10 can be removed manually, the operating personnel being shown the control commands via a visual output unit, for example a monitor, display etc., and/or via an acoustic output unit, for example a loudspeaker, headset etc. The visual and/or acoustic output unit provides information as to which processed parts 10 are to be removed and/or which processed parts 10 still have a connection to the workpiece 11. In addition, the provision of the information can include a sort order for removal.

In one embodiment of the method according to the present invention, control commands for the gripping system 140 for removing the parts 10 according to the generated removal plan are provided by the gripping system 140, which is arranged on a bridge movement system 120, which extends with its central longitudinal axis 121 transversely to the longitudinal axis 111 of the transportation unit 110 and is movable axially in the longitudinal axis 111 of the transportation unit 110, being instructed to remove one part 10 after the other from the processed workpiece 11 and to deposit it on a first parts conveyor system 130 arranged on the bridge movement system 120.

Figure 4:
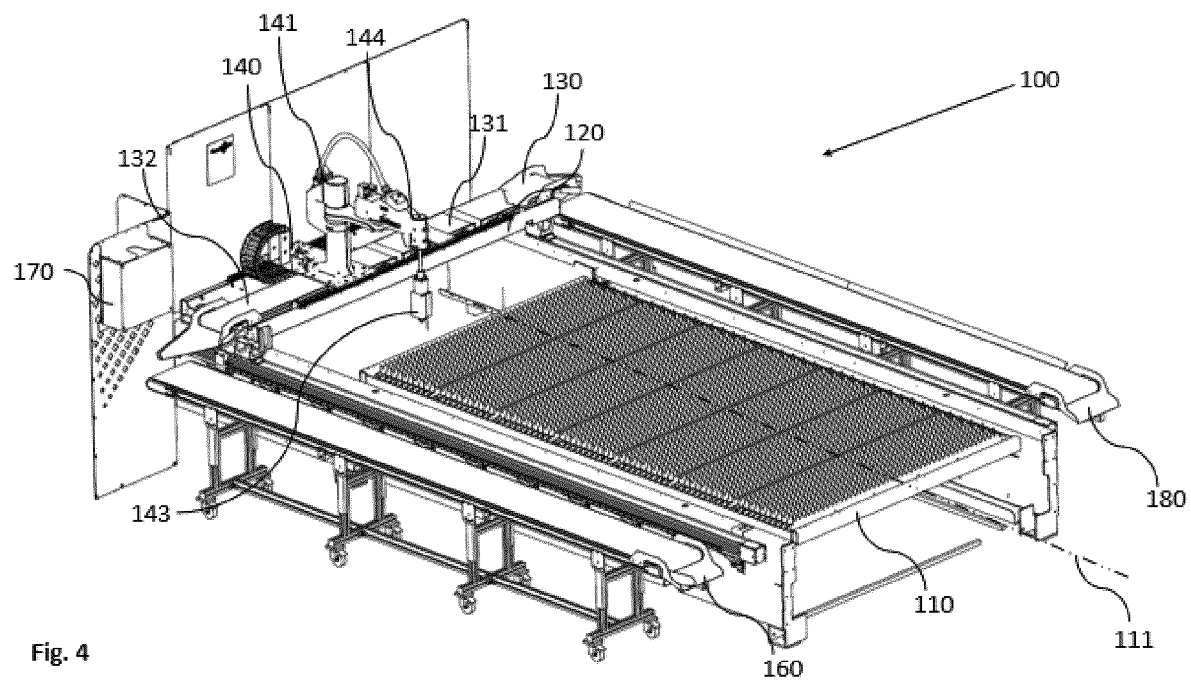
FIG. 4 shows a block diagram to show a further possible exemplary embodiment of a removal system according to the invention.

FIG. 4 shows a block diagram to show a possible exemplary embodiment of a removal system 100 according to the invention. The removal system 100 shown in FIG. 4 comprises, in addition to the first parts conveyor system 130, a second parts conveyor system 160 and a third parts conveyor system 180. In an alternative embodiment of the removal system 100 according to the invention, only one additional parts conveyor system 160 or parts conveyor system 180 can be provided in addition to the first parts conveyor system 130 (not shown).

The second parts conveyor system 160 and the third parts conveyor system 180 are preferably designed as a ribbon conveyor system or belt conveyor. In an advantageous embodiment, the second parts conveyor system 160 and the third parts conveyor system 180 comprises an axially movable conveyor belt which has a conveyor belt made of a material corresponding to the parts of the processed workpiece 11 to be transported. The second parts conveyor system 160 and the third parts conveyor system 180 can advantageously receive the parts 10 of the processed workpiece 11 from the first parts conveyor system 130 and, depending on the corresponding use, feed them to other systems or transport them to a transport container 190 (not shown). Advantageously, the parts 10 of the processed workpiece 11 are removed automatically. In addition, simplified sorting and separation can advantageously take place. The axially movable conveyor belt of the second parts conveyor system 160 and the third parts conveyor system 180 have at least one drive unit for driving the axially movable conveyor belt. The at least one drive unit is preferably designed as an electric motor that communicates with the control unit 150 (cf. FIG. 1) and receives electronic control commands from the control unit 150 or provides response signals. In an advantageous embodiment, the conveyor belt of the second parts conveyor system 160 and the third parts conveyor system 180 can be moved in a first direction and in a second direction. This enables an individual installation and use of the removal system 100 in a respective industrial scenario or adaptation to production-related and/or location-specific requirements.

The first parts conveyor system 130 according to the embodiment of the removal system 100 according to the invention from FIG. 4 comprises a first axially movable conveyor belt 131 and a second axially movable conveyor belt 132, the directions of movement of which can be controlled independently of one another and which preferably move in opposite directions. Advantageously, parts 10 of the processed workpiece 11 can be deposited and removed on the first axially movable conveyor belt 131 or the second axially movable conveyor belt 132 of the first parts conveyor system 130 by means of the gripping system 140 according to the present invention. The first axially movable conveyor belt 131 and the second axially movable conveyor belt 132 of the first parts conveyor system 130 each have at least one drive unit for driving the respective axially movable conveyor belt 131, 132. The respective drive unit is preferably designed as an electric motor that communicates with the control unit 150 (cf. FIG. 1) and receives electronic control commands from the control unit 150 or provides response signals. Advantageously, the parts deposited on the first parts conveyor system 130 can be transported according to a sorting plan and/or removal plan to a second parts conveyor system 160 or third parts conveyor system 180 and/or a first transport container 190 (cf. FIG. 5) or a second transport container (not shown) positioned on the respective sides of the transportation unit 110. A simplified sorting and separation of the parts can thus advantageously be achieved.

Furthermore, the removal system 100 comprises a tool change system 170 for changing the tools 143 for the gripping system 140 is arranged in a buffer area between the processing system 200 (cf. FIG. 1) and the transportation unit 110. The tool change system 170 is movable in the longitudinal axis 111 of the transportation unit 110 and can be moved with the bridge movement system 120. In an alternative embodiment, the tool change system 170 can be positioned in close proximity to the removal system 100, so that the gripping system 140 can automatically change tools 143 via the tool change system 170. The tool change system 170 can have individual stations in which the tools 143 are inserted and which can be gripped by the gripping system 140.

In one embodiment, the tools 143 can be selected by the gripping system 140 according to a removal plan. The removal plan is created on the basis of the cutting plan used to cut the parts 10 from the workpiece 11 in the processing system 200 (cf. FIG. 1). The cutting plan, for example, stores the dimensions, positions and weights of the cut parts 10, on the basis of which the corresponding tools 143, in particular gripping tools 145 (not shown) can be selected by the gripping system 140. The corresponding information of the cutting plan can, for example, be stored in an XML file or a comparable format, which can be loaded into the robot controller. In one embodiment, the robot controller can be embodied in the control unit 150 (cf. FIG. 1). The robot controller selects the corresponding tool 143 in accordance with the information stored in the XML file for the part 10 to be removed. The control unit 150 can advantageously generate an optimal removal plan, so that all parts 10 of the processed workpiece 11 can be removed in a corresponding sequence with a minimum number of tool changes.

Figure 5:
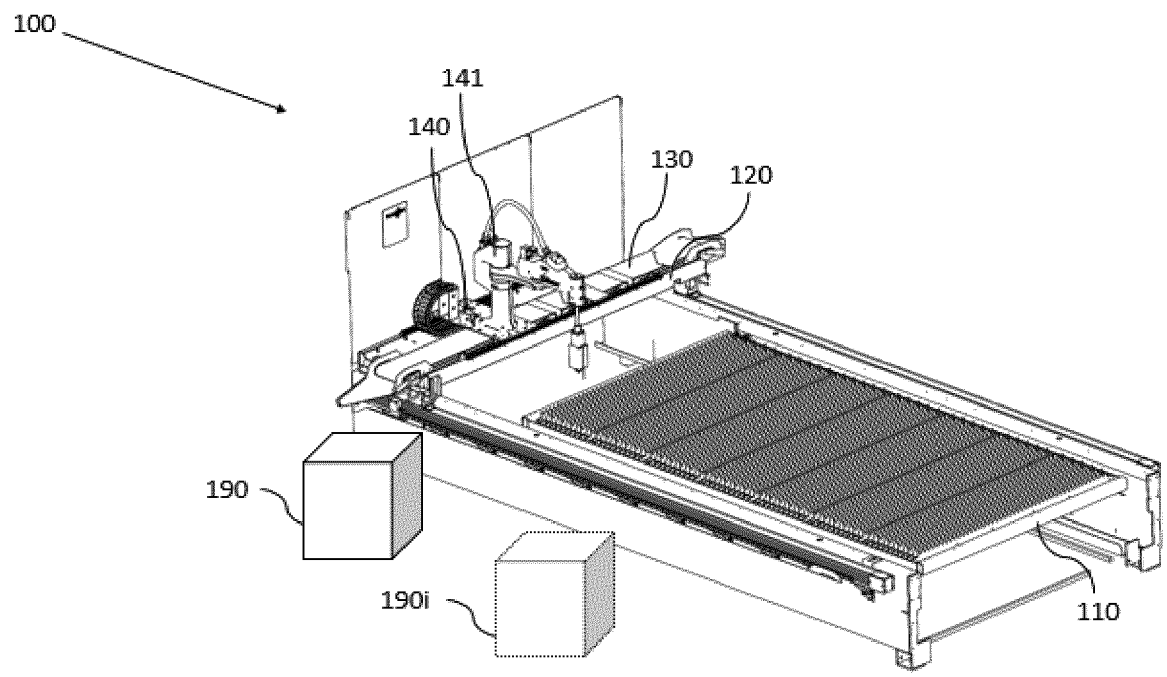
FIG. 5 shows a block diagram to show a further possible exemplary embodiment of a removal system according to the invention.

The gripping system 140 of the embodiment of the removal system 100 shown in FIG. 5 comprises a gripping robot 141 with a gripping arm 144 on which a tool 143 is arranged. The tool 143 is preferably designed as a gripping tool 145 (not shown). The gripping tool 145 comprises at least one electrically conductive gripping tool. In an advantageous embodiment, the electrically conductive gripping tool is designed as an electrically conductive suction device, preferably as an electrically conductive vacuum suction device. In one embodiment, the electrically conductive gripping tool 145 can have a plurality of vacuum suction devices, in which one vacuum suction device is designed as an electrically conductive vacuum suction device. Processed parts with a wide range of different shapes, sizes, dimensions, materials and/or material thickness can thus be sucked in (gripped). In a further embodiment, the electrically conductive gripping tool 145 can have a plurality of vacuum suction devices, in which at least two vacuum suction devices are designed as electrically conductive vacuum suction devices. Processed parts with a wide range of different shapes, sizes, dimensions, materials and/or material thickness can thus be sucked in (gripped). Furthermore, the functionality of the electrically conductive vacuum suction device is designed in a redundant manner. Advantageously, a different combination and number of electrically conductive suction devices can be installed to form a gripping tool 145 and can be made available in the gripping system 140 via the tool change system 170.

In an advantageous embodiment, the gripping tool 145 comprises an electrically conductive material for receiving the electrically conductive vacuum suction devices, with which each electrically conductive vacuum suction device can accordingly provide an electrical signal without each electrically conductive vacuum suction device having to be connected separately to a voltage source 148 (not shown).

FIG. 5 shows a block diagram to show a possible exemplary embodiment of a removal system 100 according to the invention. The removal system 100 shown in FIG. 5 comprises a transport container 190 for receiving the parts 10 of the processed workpiece 11 (not shown). The transport container 190 can be designed as a portable container or as a mobile container. A portable container is, for example, a container that is removed by an operator of the removal system 100. A mobile container is, for example, a container that moves autonomously to another position and removes the received parts 10. In an alternative embodiment, the mobile container can be steered or controlled remotely by a controller.

In a further embodiment, the removal system 100 according to the invention can have a plurality of transport containers 190$i$ which are filled with parts 10 to be removed via the first parts conveyor system 130. Advantageously, the parts conveyor system 130 can be moved axially in the longitudinal axis 111 of the transportation unit 110 by the bridge movement system 120 and thus the parts 10 can be transported into the respective transport containers 190$i$, for example according to a sorting plan.

In one embodiment, the removal system 100 according to the invention can have a large number of transport containers 190, 190$i$ on each side of the transportation unit 110. In an alternative embodiment, the removal system 100 according to the invention can have a plurality of transport containers 190, 190$i$ on one side of the transportation unit 110 and a second parts conveyor system 160 (not shown) on the other side of the transportation unit.

Figure 6:
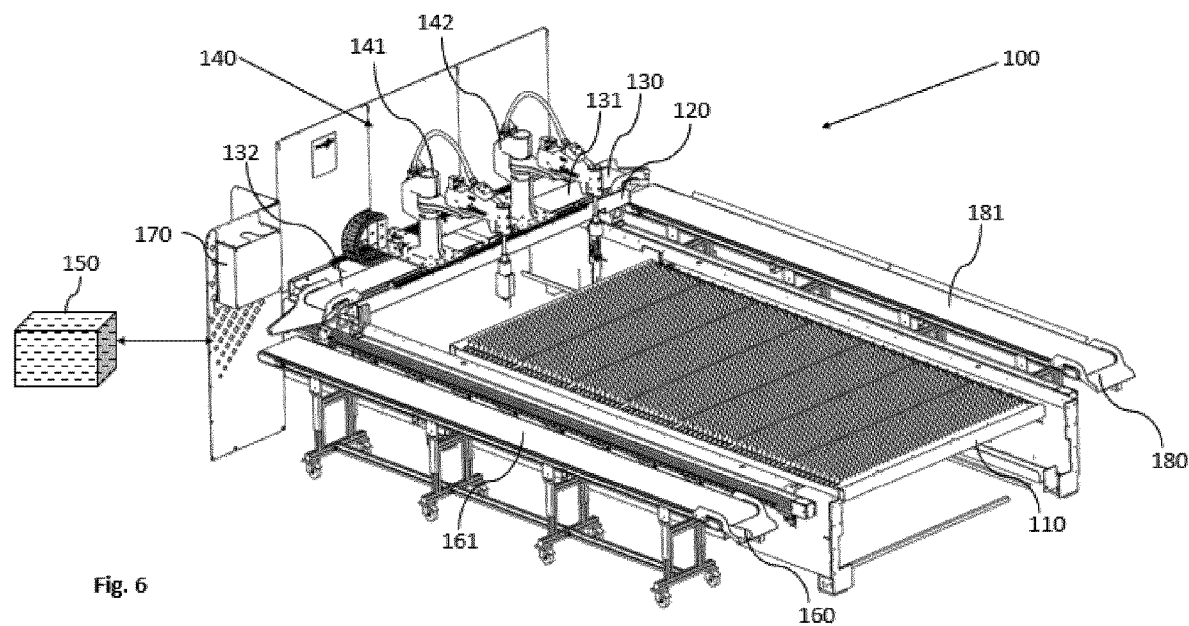
FIG. 6 shows a block diagram to show a further possible exemplary embodiment of a removal system according to the invention.

FIG. 6 shows a block diagram to show a possible exemplary embodiment of a removal system 100 according to the invention. The removal system 100 shown in FIG. 6 comprises a gripping system 140 with a first gripping robot 141 and a second gripping robot 142. In an advantageous embodiment, the gripping system 140 comprises at least one gripping arm 144, on which the at least one tool 143 is arranged. In a further advantageous embodiment, the first gripping robot 141 and the second gripping robot 142 comprise at least one tool 143, in particular a gripping tool 145. The gripping system 140 preferably comprises a SCARA robot (Selective Compliance Assembly Robot Arm).

In an alternative embodiment, the gripping system 140 can be designed as a Cartesian robot system. The Cartesian robot system comprises linear drives and can be designed as a two-axis or three-axis Cartesian robot system.

According to the embodiment of the removal system 100 shown in FIG. 6, a collision avoidance algorithm is used which ensures that the first gripping robot 141 and the second gripping robot 142 of the gripping system 140 do not collide in a predefined collision zone of a common working area. The collision avoidance algorithm can be stored in a memory unit 151 (cf. FIG. 6) of the control unit 150 and executed by the control unit 150. The control unit 150 is in communication via a communication link with the removal system 100 and the corresponding components of the removal system 100. The communication link can comprise a wired and/or wireless communication link. For example, the wired communication connection can include Ethernet, fibre optic, serial connection types, for example RS232, RS485.

The predefined collision zone represents an area into which the first gripping robot 141 and the second gripping robot 142 could engage or enter at the same time due to the dimensioning of the gripping arms. The first gripping robot 141 and the second gripping robot 142 exchange the current position data in this regard. For example, the first gripping robot 141 can transmit the information to the second gripping robot 142 that the former is located in the collision zone in order to remove a part 10. If the second gripping robot 142 receives the control command for removing a part 10 that lies in the collision zone on the basis of the removal plan, this control command is suspended, for example, until the collision zone is released again or pushed backwards in the order in which the parts are removed and continued with another part.

In an alternative embodiment, for example, a first gripping robot 141 actively requests approval of the second gripping robot 142 if the former wants to enter the collision zone on the basis of a control command. Only when the second gripping robot 142 actively approves, for example that it is not in the collision zone, can the first gripping robot 141 enter the collision zone. At this moment, the first gripping robot 141 blocks entry into the collision zone.

The removal system 100 comprises a first parts conveyor system having a first conveyor belt 131 and a second conveyor belt 132. Advantageously, the second gripping robot 142 can deposit removed parts 10 on the first conveyor belt 131, which are removed to a third parts conveyor system 180 or alternatively to a transport container 190, 190$i$ (not shown). In addition, the first gripping robot 141 can deposit removed parts 10 on the second conveyor belt 132, which are removed to a second parts conveyor system 160 or alternatively to a transport container 190, 190$i$ (not shown).

Figure 7:
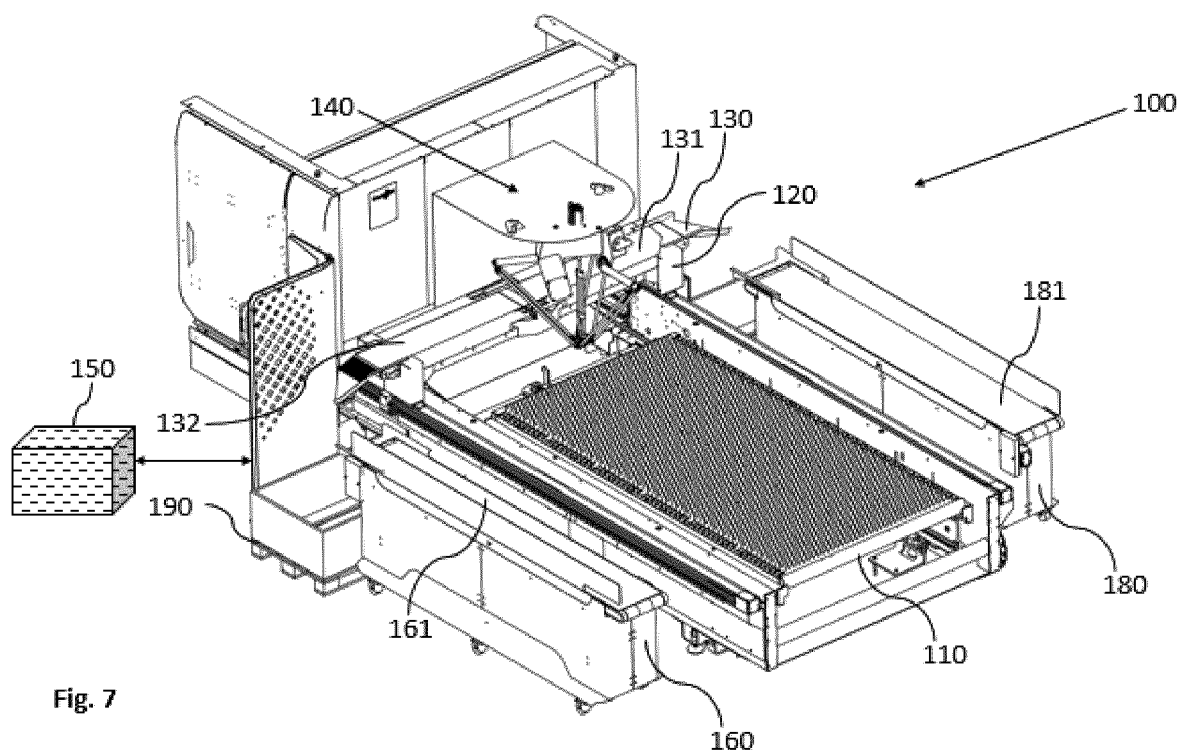
FIG. 7 shows a block diagram to show a further possible exemplary embodiment of a removal system according to the invention.

FIG. 7 shows a block diagram to show a possible exemplary embodiment of a removal system 100 according to the invention. The removal system 100 shown in FIG. 7 comprises a transportation unit 120, a bridge movement system 120, a first parts conveyor system 130, which is arranged on the bridge movement system 120, a second parts conveyor system 160 and a third parts conveyor system 180. In the embodiment shown in FIG. 7, the first parts conveyor system 130 comprises a first conveyor belt 131 and a second conveyor belt 132. In an alternative embodiment, the first parts conveyor system can comprise a conveyor belt. The first parts conveyor system 130, the second parts conveyor system 160 and the third parts conveyor system 180 communicate with the control unit 150 of the removal system 100. The control unit 150 can provide control commands for instructing the speed and the conveying direction of the conveyor belts. The second parts conveyor system 160 and the third parts conveyor system 180 can have a modular design and can be arranged on the sides of the transportation unit 110. The second parts conveyor system 160 and the third parts conveyor system 180 can be arranged to be displaceable on wheels. This advantageously enables good accessibility to the transportation unit 110. The electrical connections or the communication connections of the second parts conveyor system 160 and the third parts conveyor system 180 are designed as separable electrical connections or communication connections, for example as a plug connection. The second parts conveyor system 160 and the third parts conveyor system 180 transport the processed parts 10 of the workpiece 11, which were previously arranged on the conveyor belts 131, 132 of the first parts conveyor system 130, into the provided transport containers 190 or into a subsequent process, for example a sorting process.

The removal system 100 comprises a gripping system 140. The gripping system 140 is designed as a delta robot. The gripping system 140 is arranged on the bridge movement system 120, in particular the delta robot is installed on the bridge movement system 120. The Delta robot is designed as a parallel arm robot with rod kinetics. The delta robot has at least three arms which are linked to the base of the delta robot via universal joints. The delta robot is advantageously a light robot which can quickly remove the processed parts 10 from the workpiece 11 and deposit them on the bridge movement system 120 with the first parts conveyor system 130 and the two conveyor belts 130, 131.

The axes of the delta robot work together to form a closed kinematic chain. The base of the Delta robot is mounted above the moving arms. In particular, the arms are hung on the base. The ends of the arms are connected to a platform via which the tool 143 (not shown) is received. The drive of the Delta robot is installed in the base and drives the arms. For example, a linear or a rotary drive can be used as the drive. The platform then moves in the X, Y and Z traverse paths. In one embodiment, the delta robot is designed to perform rotating movements. Advantageously, the removal of processed parts 10 can be carried out with high accuracy by delta robots. In addition, the low mass of the arms (drive at the base) means that there is little inertia, which enables high speeds and accelerations to be achieved.

Figure 8:
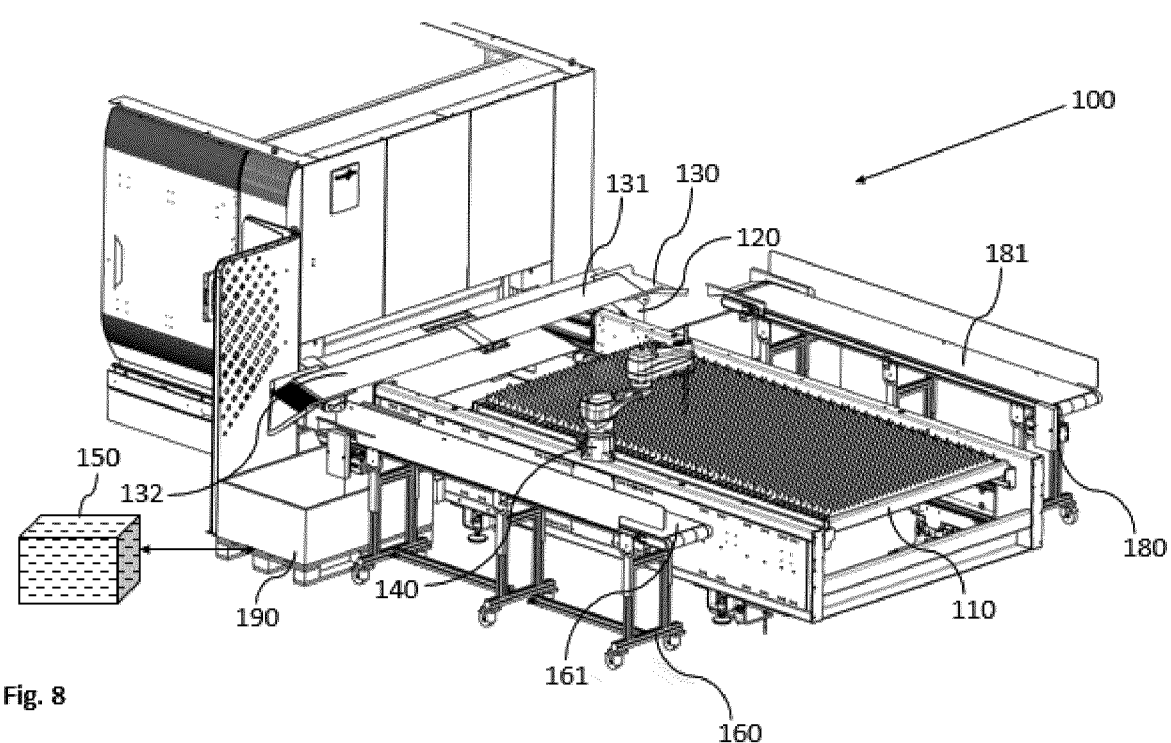
FIG. 8 shows a block diagram to show a further possible exemplary embodiment of a removal system according to the invention.

FIG. 8 shows a block diagram to show a possible exemplary embodiment of a removal system 100 according to the invention. The removal system 100 shown in FIG. 8 comprises the components like the exemplary embodiment shown in FIG. 7. The gripping system 140 in the exemplary embodiment in FIG. 8 is designed as a robot handling unit which is arranged on the side of the transportation unit 110 on the side of the second parts conveyor system 160. In a further embodiment, a further robot handling unit can be arranged on the side of the third parts conveyor system 180. The robot handling units can be designed as a SCARA robot and be firmly positioned. The processed parts 10 can be removed from the workpiece 11 by the firmly positioned SCARA robots and deposited on the parts conveyor systems 160, 180 located therebehind. The processed parts can be transported into a transport container 190 or to a connection process.

In a further embodiment, a further gripping system 140, for example a SCARA robot, can be installed on the bridge movement system 120, which can remove processed parts 10 from the workpiece 11 and transport them to the first parts conveyor system.

Figure 9:
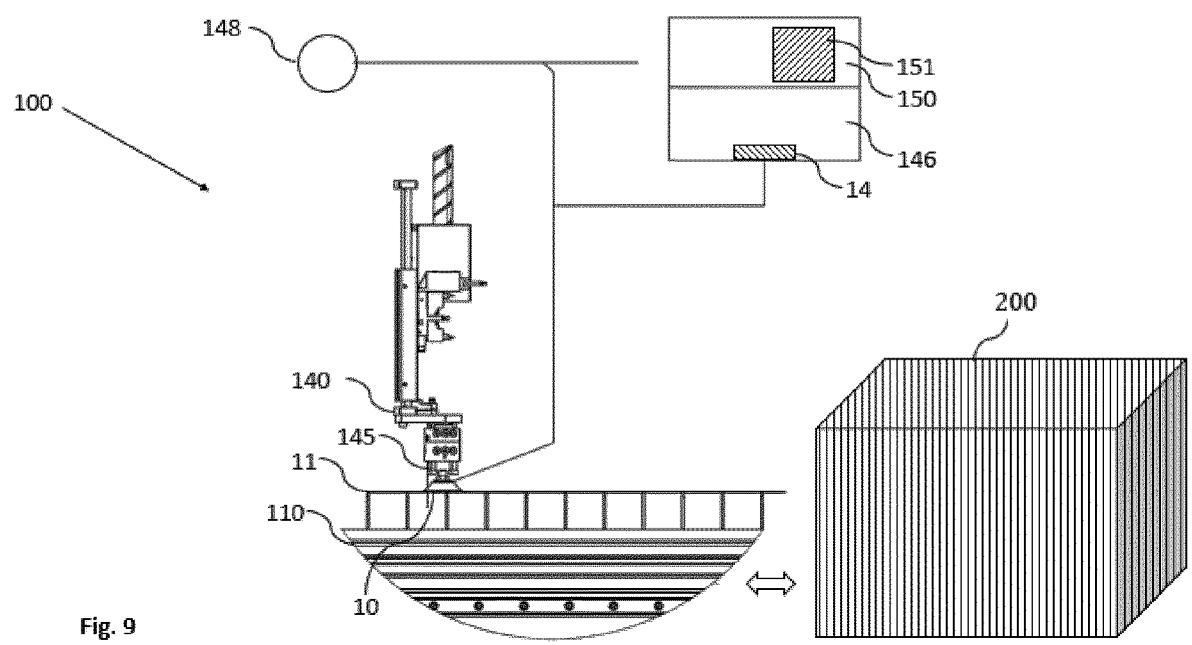
FIG. 9 shows a block diagram to show a possible exemplary embodiment of a gripping system of the removal system according to the invention.

FIG. 9 shows a block diagram to show a possible exemplary embodiment of a gripping system 140 of a removal system 100 according to the invention. In FIG. 9, reference numeral 140 denotes the gripping system. The gripping system 140 is designed to grip a processed part 10 (cf. FIGS. 10 and 11) of a workpiece 11 and to transport and deposit it, for example, to a first parts conveyor system 130 (cf. FIG. 1). The workpiece 11, for example a metal sheet, is processed in a processing system 200. In one embodiment, the processing system 200 comprises a laser cutting system in which a processed part 10, for example a contour, is cut from the workpiece 11. The workpiece 11 can comprise different sheet thicknesses and/or sheet area contents with different external dimensions corresponding to the processing system 200, which can be processed by the processing system 200. A contour or a plurality of contours can be cut from a workpiece 11.

The workpiece 11 is deposited on a transportation unit 110 for processing. The transportation unit 110 can be moved into the processing system 200 for the processing of the workpiece 11 and can be moved out of the processing system 200 for the removal of the processed part 10 by the transportation unit 110. In one embodiment, the transportation unit 110 is designed as a changing table comprising two tables. The two tables are arranged in two guide planes. This enables a workpiece 11 to be processed simultaneously in the processing system 200 and the parts 10 of a previously processed value 11 to be unloaded by the gripping system 140. In this case, the tables of the changing table 110 are exchanged outside the processing system 200.

The gripping system 140 can be designed as a gripping robot 141, in particular as a SCARA robot. In one embodiment, the gripping system 140 has a gripping arm 144. In an advantageous embodiment, the gripping system 140 has at least one gripping arm 144 with a plurality of axially controllable axes. The mobility, precision and range of the gripping system 140 can be increased by the different axes.

The gripping system 140 has a tool 143, in particular a gripping tool 145 for lifting the processed parts 10 out of the workpiece 11. The gripping tool 145 is arranged on the gripping arm 144 of the gripping system 140. In an advantageous embodiment, the gripping tool 145 is designed as a modular interchangeable gripping tool 145.

The gripping system 140 communicates with a control unit 150 via a communication link. In one embodiment, the control unit 150 has a detector unit 146. In one embodiment, the detector unit 146 can be designed as a voltage measuring device, via which a falling voltage can be determined. In one embodiment, the detector unit 146 also has an analogue input card (not shown) which is connected to the analogue input 147 for evaluating the voltage drop at the analogue input 147. The analogue input 147 is designed to receive an analogue electrical signal, in particular a DC voltage signal. The analogue electrical signal is evaluated by the analogue input card and can be converted into a digital signal usable for control by an analogue-digital conversion integrated on the analogue input card by an AD converter. This usable digital signal can be used in accordance with the value for controlling the processing system 200 and/or for displaying it to an operator of the processing system 200. In one embodiment, the analogue input 147 and the detector unit 146 are integrated in the gripping system 140 designed as a gripping robot, and the control unit 150 is an external component which communicates with the gripping system 140 of the removal system 100 via a communication link. This has the advantage that the voltage losses in the connecting lines, in particular between the electrically conductive gripping tool 145 and the analogue input 147 or the detector unit 146, can be minimised or limited. Lines that are too long lead to an increased voltage drop at the connecting lines, which falsifies the detection of the voltage drop at the analogue input 147 and can lead to a measurement error. The control unit 150 is preferably implemented locally on the gripping system 140. In one embodiment, the control unit 150 can be implemented in the control unit or the controller of the gripping system 140 and/or can be instantiated as an additional entity on the controller of the gripping system 140. In particular, the control unit 150 can be implemented as a central unit for the removal system 100.

In addition, the gripping system 140 has a voltage supply via a voltage source 148, in particular via a DC voltage source. The voltage source 148 can provide a voltage in a voltage range from 0.1 to 20 volts, in particular in a range from 8 to 12 volts, preferably from 10 volts. In embodiments with a voltage higher than 10 volts, the 10 volt voltage can be provided via a voltage divider. The voltage source 148 is connected to the electrically conductive gripping tool 145. The voltage source 148 is also connected in parallel to the electrically conductive gripping tool 145 to the analogue input 147. A DC voltage of 10 volts is preferably applied to both the electrically conductive gripping tool 145 and the analogue input 147.

In one embodiment, the detector unit 146 and the transportation unit 110 have the same ground potential. If a processed part 10 has an electrical connection 12 (cf. FIG. 10) via a material web (residual material in the case of a faulty cut), the ground potential of the transportation unit 110 via the workpiece 11 is also present at the processed part 10 when the electrically conductive gripping tool 145 has raised the processed part 10 above the level of the suction volume. This leads to a voltage drop of the 10 volts at the analogue input 147, which can be evaluated in an advantageous manner and provides information about the processed part 10 to be lifted, for example which processed part 10 of the workpiece 11 is defective.

The gripping system 140 has a tool 143. In one embodiment, the tool 143 comprises at least one electrically conductive gripping tool 145. The electrically conductive gripping tool 145 is constructed from a material that conducts the electrical current and has an electrical resistance with a resistance value. The resistance value depends on the material and the size of the electrically conductive gripping tool 145.

In one embodiment, the electrically conductive gripping tool 145 of the gripping system 140 is modularly interchangeable. For the purposes of the present invention, modular is to be understood to mean that different gripping tools can be exchanged in accordance with the requirements in terms of size and weight of the processed parts 10 to be lifted, as well as the type of use and area of use.

The electrically conductive gripping tool 145 comprises an electrically conductive suction device, preferably an electrically conductive vacuum suction device. In one embodiment, the electrically conductive gripping tool 145 comprises at least one suction device or a plurality of suction devices and one electrically conductive suction device or a plurality of electrically conductive suction devices. Differently processed parts 10 with different requirements can thus advantageously be lifted. There is also redundancy for the electrically conductive suction device and for the voltage drop at the analogue input 147. This is advantageous if there is a second analogue input 147 and a second analogue input card. This results in redundant monitoring of the measurement and evaluation of the voltage drop.

Figure 10:
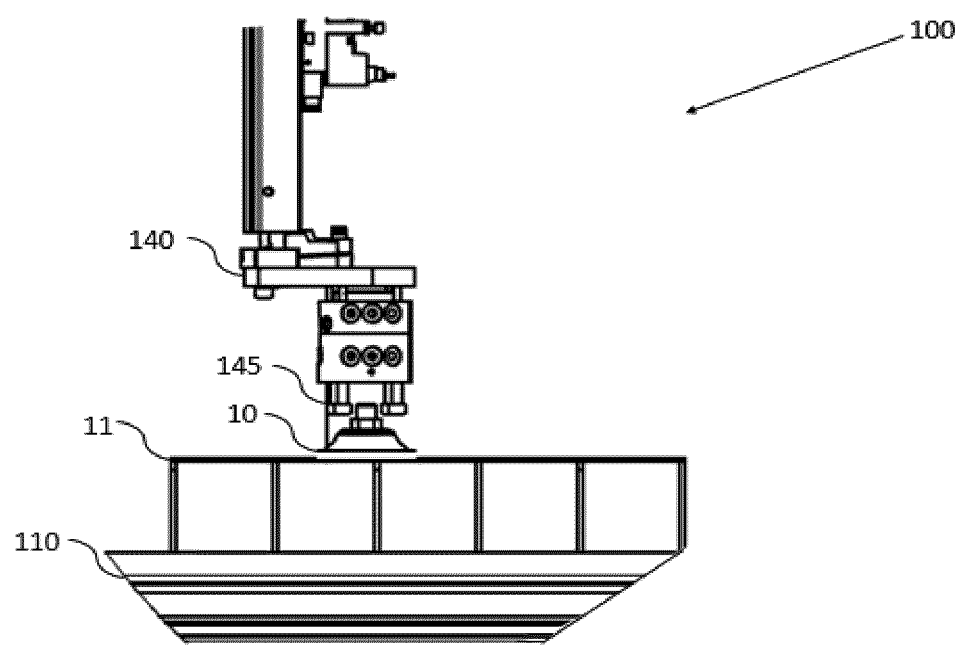
FIG. 10 shows a block diagram to show a further possible exemplary embodiment of a gripping system of a removal system according to the invention.

FIG. 10 shows a block diagram to show a further possible exemplary embodiment of a gripping system 140 of the removal system 100 according to the invention. FIG. 10 shows a gripping system 140 which lifts a processed part 10 out of the workpiece 11 by means of an electrically conductive gripping tool 145, preferably by means of an electrically conductive vacuum suction device. The electrically conductive gripping tool 145, which is designed as an electrically conductive vacuum suction device, has a resistance value. The resistance value of the electrically conductive vacuum suction device can be measured. A voltage, preferably of 10 volts, can be applied to the electrically conductive vacuum suction device via the voltage source 148 (cf. FIG. 9). The voltage of 10 volts from the voltage source 148 is connected in parallel to an analogue input 147. The analogue input 147 has a connection to a detector unit 146 for detecting the voltage drop. In one embodiment, the detector unit 146 comprises an analogue input card. The transportation unit 110 and the detector unit 146 have a ground potential. If the electrically conductive vacuum suction device comes into contact with the transportation unit 110 via a processed part 10 that is in electrical contact with the workpiece 11 during the lifting, the voltage at the analogue input 147 drops at an originally applied voltage of, for example, 10 volts to 2 volts. If, as shown in FIG. 10, the processed part 10 is sucked or raised by the electrically conductive vacuum suction device and there is no contact between the processed part 10 and the workpiece 11 and thus the transportation unit 110, the 10 volts are still connected to the analogue input 147 and are measurable and evaluable.

Figure 11:
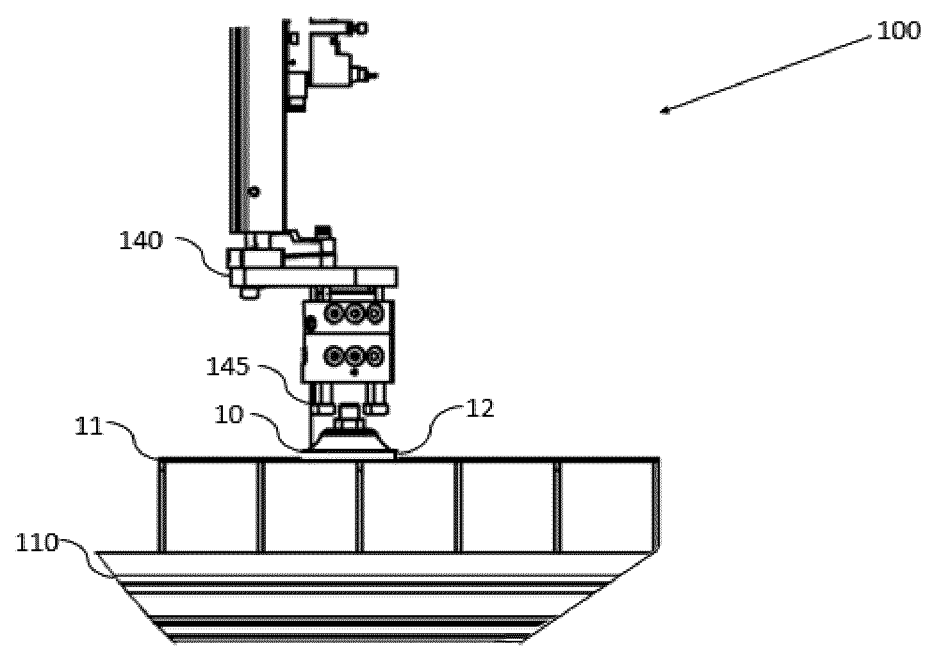
FIG. 11 shows a block diagram to show a further possible exemplary embodiment of a gripping system of a removal system according to the invention.

FIG. 11 shows a block diagram to show a further possible exemplary embodiment of a gripping system 140 of the removal system 100 according to the invention. FIG. 11 shows a gripping system 140 which lifts a processed part 10 out of the workpiece 11 by means of an electrically conductive gripping tool 145, preferably an electrically conductive vacuum suction device. A voltage across, preferably 10 volts, can be applied to the electrically conductive gripping tool 145, which is designed as an electrically conductive vacuum suction device, by the voltage source 148 (cf. FIG. 9). The voltage of 10 volts from the voltage source 148 is applied in parallel to an analogue input 147. The analogue input 147 has a connection to a detector unit 146 for detecting the voltage drop. In one embodiment, the detector unit 146 comprises an analogue input card. The transportation unit 110 and the detector unit 146 have a ground potential. If the electrically conductive vacuum suction device comes into contact with the transportation unit 110 via a processed part 11 that is in electrical contact with the workpiece 11 during the lifting, the voltage at the analogue input 147 drops at an originally applied voltage of, for example, 10 volts to 2 volts. If, as shown in FIG. 8, the processed part 10 is now sucked or raised by the electrically conductive vacuum suction device and there is an electrical contact or an electrical connection 12 between the processed part 10 and the workpiece 11 and thus the transportation unit 110, the 10 volt voltage previously present at the analogue input 147 drops, for example, to a voltage value of 2 volts. This voltage drop can be evaluated by the detector unit 146 and appropriate measures can be implemented. For example, the gripping system 140 and/or the removal system 100 can issue a fault message or warning and show which processed part 10 has an electrical connection 12 to the workpiece 11.

In an advantageous embodiment, the analogue input 147 is designed to be configurable. In an advantageous manner, the analogue input 147 can be configured to changing values for the voltage drop, which may result from the materials for the workpieces 11 to be processed due to the conductivity value. For example, copper has a better conductivity coefficient than steel, which makes copper a better conductor than steel. In this regard, the voltage drop for a 10 volt output voltage for copper is higher than that for steel. The higher voltage drop can be predetermined by the configurable analogue input 147, whereby different types of material can be checked with the present invention.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise their advantageous effects.

The scope of protection of the present invention is given by the claims and is not limited by the features illustrated in the description or shown in the figures.

REFERENCE SYMBOLS

1 Method
10 Parts
11 Workpiece
12 Electrical connection
100 Removal system
110 Transportation unit
111 Longitudinal axis of transportation unit
120 Bridge movement system
121 Central longitudinal axis of bridge movement system
130 First parts conveyor system
131 Conveyor belt
132 Conveyor belt
140 Gripping system
141 Gripping robot
142 Gripping robot
143 Tool
144 Gripping arm
145 Gripping tool
146 Detector unit
147 Analog input
148 Voltage source
150 Control unit
151 Memory unit
160 Second parts conveyor system
161 Conveyor belt
170 Tool change system
180 Third parts conveyor system
181 Conveyor belt
190 Transport container
200 Processing system
S1-S3 Process steps

The invention claimed is:

1. A removal system for removing parts processed in a processing system, the removal system comprising:
a transportation unit which is used for intermediate storage and/or transportation of a workpiece processed with the processing system, the processed workpiece comprising the parts to be removed, with:
a bridge movement system which extends with its central longitudinal axis transversely to a longitudinal axis of the transportation unit and can be moved axially in the longitudinal axis of the transportation unit;
a parts conveyor system comprising a first parts conveyor system, which is arranged on the bridge movement system and extends substantially parallel to the central longitudinal axis of the bridge movement system; and
a control unit designed to communicate with the transportation unit, the bridge movement system and the parts conveyor system and to provide control commands for the transportation unit, the bridge movement system and the parts conveyor system, and
wherein the first parts conveyor system comprises first and second movable conveyor belts movable in the central longitudinal axis direction, the direction of movement of which can be controlled independently of one another and which move in opposite directions.

2. The removal system according to claim 1, wherein the transportation unit comprises a transport table or a changing table.

3. The removal system according to claim 1, wherein the removal system comprises a gripping system and the gripping system communicates with the control unit.

4. The removal system according to claim 3, wherein the gripping system is arranged on the removal system and is designed to remove the processed parts from the workpiece and to deposit them at least onto the parts conveyor system.

5. The removal system according to claim 3, wherein the gripping system is arranged on the bridge movement system and is designed to remove the processed parts from the workpiece and to deposit them at least onto the parts conveyor system.

6. The removal system according to claim 1, wherein the removal system comprises a second parts conveyor system having at least one conveyor belt that can be moved axially in the direction of the longitudinal axis of the transportation unit.

7. The removal system according to claim 1, wherein the removal system comprises a third parts conveyor system having at least one conveyor belt that can be moved axially in the direction of the longitudinal axis of the transportation unit.

8. The removal system according to claim 1, wherein the first parts conveyor system comprises at least a first axially movable conveyor belt.

9. The removal system according to claim 3, wherein the gripping system comprises at least one gripping robot, wherein the gripping robot has at least one tool including a gripping tool.

10. The removal system according to claim 3, wherein the gripping system comprises at least one gripping arm, on which the at least one gripping tool is arranged.

11. The removal system according to claim 9, wherein the gripping tool comprises at least one electrically conductive gripping tool.

12. The removal system according to claim 3, wherein the gripping system comprises a detector unit, which is designed to detect whether a processed part has an electrical connection to the workpiece.

13. The removal system according to claim 9, wherein the two gripping robots are arranged on the bridge movement system in such a way that they can collectively remove the parts to be removed from each area of the workpiece.

14. The removal system according to claim 9, wherein the control unit uses a collision avoidance algorithm stored in a memory unit, which ensures that the two gripping robots do not collide in a predefinable collision zone of a shared working area.

15. The removal system according to claim 3, in which the gripping system is controlled with electronic control commands which are generated by the control unit in response to a removal plan generated on the basis of a detected cutting plan.

16. The removal system according to claim 7, in which the first parts conveyor system, the second parts conveyor system and/or the third parts conveyor system are controlled by the control unit in synchronization with the gripping system with regard to a control and/or regulation of a speed at which the first parts conveyor system and/or the second parts conveyor system and/or the third parts conveyor system are operated.

17. The removal system according to claim 5, in which the gripping system is arranged to be movable along the central longitudinal axis of the bridge movement system.

18. The removal system according to claim 1, in which a tool change system for changing the tools for the gripping system is arranged in a buffer area between the processing system and the transportation unit.

19. A method for removing parts processed in a processing system, having the following method steps:
  providing a removal system as provided in claim 1;
  detecting a processed workpiece with parts on the transportation unit;
  generating or reading a removal plan for processed parts on a basis of a detected cutting plan;
  providing control commands for removing the processed parts according to the generated or read removal plan so that one processed part after the other can be removed from the processed workpiece and deposited on the first parts conveyor system arranged on the bridge movement system.

20. The method according to claim 19, in which providing control commands comprises providing control commands for a gripping system for removing the processed parts according to the generated removal plan, in which the gripping system, which is arranged on a bridge movement system, is instructed to remove one processed part after the other from the workpiece and stored on at least one parts conveyor system arranged on the bridge movement system, wherein the bridge movement system extends with its central longitudinal axis transversely to the longitudinal axis of the transportation unit and can be moved axially in a longitudinal axis of the transportation unit.

21. The method according to claim 19, in which a conveying direction and/or a conveying speed of the parts conveyor system can be set as a function of the removal plan.

22. The method according to claim 19, wherein the gripping system comprises two gripping robots, which are instructed with the generated control commands to grip processed parts in a work area assigned to them and thereby apply a collision avoidance algorithm in a pre-definable collision zone.

23. The method according to claim 19, in which control commands are generated for moving the bridge movement system during a removal process, for moving the first parts conveyor system and for moving the bridge movement system into a rest position after removal of the workpiece.

24. A computer program with program code for executing a method according to claim 19 when the computer program is executed on an electronic device.

* * * * *